United States Patent
Herman et al.

(10) Patent No.: US 11,760,584 B2
(45) Date of Patent: Sep. 19, 2023

(54) FLOW CONTROL FOR BOTTOM DUMP PNEUMATIC MATERIAL HANDLING

(71) Applicant: QUICKTHREE TECHNOLOGY, LLC, Yardley, PA (US)

(72) Inventors: Alvin Herman, Saskatoon (CA); Erin Herman, Clavet (CA); Scott Manson, Lumsden (CA); Joseph Welter, Saskatoon (CA)

(73) Assignee: Quickthree Technology, LLC, Yardley, PA (US)

( * ) Notice: Subject to any disclaimer, the term of this patent is extended or adjusted under 35 U.S.C. 154(b) by 160 days.

(21) Appl. No.: 17/370,039

(22) Filed: Jul. 8, 2021

(65) Prior Publication Data

US 2022/0017310 A1 Jan. 20, 2022

Related U.S. Application Data

(60) Provisional application No. 63/051,734, filed on Jul. 14, 2020.

(51) Int. Cl.
*B65G 53/66* (2006.01)
*B65G 53/04* (2006.01)
(Continued)

(52) U.S. Cl.
CPC ............. *B65G 53/66* (2013.01); *B65G 53/04* (2013.01); *B65G 53/36* (2013.01); *B65G 53/528* (2013.01); *B65G 41/008* (2013.01); *G05D 7/0617* (2013.01)

(58) Field of Classification Search
None
See application file for complete search history.

(56) References Cited

U.S. PATENT DOCUMENTS

| 1,431,857 A | 10/1922 | Willcox |
| 2,255,925 A | 9/1941 | Heylandt |

(Continued)

FOREIGN PATENT DOCUMENTS

| CA | 2888014 | 10/2016 |
| EP | 1774843 | 4/2007 |
| GB | 2028759 | 3/1980 |

OTHER PUBLICATIONS

Mills, David; "Pneumatic Conveying Design Guide, Second Edition" 2004.

(Continued)

*Primary Examiner* — Joseph A Dillon, Jr.
(74) *Attorney, Agent, or Firm* — Sheehan Phinney Bass & Green PA

(57) ABSTRACT

A material handling system includes a chassis, a conveyor system supported by the chassis, a pneumatic conveying system supported by the chassis and a storage container supported by the chassis. The conveyor system is configured to convey a granular material from a material unloading station to an inlet of the storage container. Multiple pods are beneath the storage container. Each pod is connected to the storage container by a corresponding pod fill line. A pneumatic conveying line is beneath the pods. The pneumatic conveying line is connected to each of the pods. Each pod has a full level sensor configured to sense when the pod is full or close to full, and an empty level sensor configured to sense when the pod is empty or close to empty.

35 Claims, 24 Drawing Sheets

(51) Int. Cl.
    *B65G 53/52*         (2006.01)
    *B65G 53/36*         (2006.01)
    *B65G 41/00*         (2006.01)
    *G05D 7/06*          (2006.01)

(56) References Cited

U.S. PATENT DOCUMENTS

| | | | | |
|---|---|---|---|---|
| 3,644,003 | A * | 2/1972 | Von Funk | B65G 53/4691 406/126 |
| 4,106,817 | A * | 8/1978 | Tsuzuku | B65G 53/06 406/68 |
| 4,183,702 | A * | 1/1980 | Bonnel | B65G 53/18 406/56 |
| 4,355,929 | A * | 10/1982 | Snowdon | B65G 53/12 406/146 |
| 4,427,133 | A | 1/1984 | Kierbow | |
| 4,545,410 | A * | 10/1985 | Paul | B65G 53/12 406/3 |
| 4,701,095 | A | 10/1987 | Berryman | |
| 4,742,938 | A * | 5/1988 | Niewold | B65G 21/12 222/536 |
| 4,850,750 | A * | 7/1989 | Cogbill | B01F 33/502 414/300 |
| 5,108,249 | A * | 4/1992 | Kinzenbaw | B60P 1/38 414/528 |
| 5,125,223 | A | 6/1992 | McKenna | |
| 5,538,286 | A * | 7/1996 | Hoff | B60P 3/16 406/41 |
| 5,634,713 | A * | 6/1997 | Abe | B01F 33/71 406/60 |
| 5,779,398 | A | 7/1998 | Battle | |
| 5,795,108 | A * | 8/1998 | Lightle | B65G 53/12 406/48 |
| 5,888,044 | A * | 3/1999 | Baskerville | A01C 15/003 414/528 |
| 6,089,795 | A | 7/2000 | Booth | |
| 6,332,739 | B1 * | 12/2001 | Sakai | A21C 9/04 222/64 |
| D688,597 | S | 8/2013 | Oren | |
| 8,523,496 | B2 * | 9/2013 | Bartek | B65G 53/66 406/60 |
| D694,670 | S | 12/2013 | Oren | |
| 8,668,430 | B2 | 3/2014 | Oren | |
| 8,734,081 | B2 | 5/2014 | Stegemoeller | |
| 9,022,835 | B1 | 5/2015 | Gus | |
| 9,162,603 | B2 | 10/2015 | Oren | |
| 9,248,772 | B2 | 2/2016 | Oren | |
| 9,260,257 | B2 | 2/2016 | Stegemoeller | |
| 9,340,353 | B2 | 5/2016 | Oren | |
| 9,394,102 | B2 | 7/2016 | Oren | |
| 9,421,899 | B2 | 8/2016 | Oren | |
| 9,440,785 | B2 | 9/2016 | Oren | |
| 9,446,801 | B1 | 9/2016 | Oren | |
| 9,527,664 | B2 | 12/2016 | Oren | |
| RE46,334 | E | 3/2017 | Oren | |
| 9,630,223 | B1 | 4/2017 | Smith | |
| 9,643,774 | B2 | 5/2017 | Oren | |
| 9,656,799 | B2 | 5/2017 | Oren | |
| 9,663,303 | B2 * | 5/2017 | Waldner | B65G 41/008 |
| 9,670,752 | B2 | 6/2017 | Glynn | |
| 9,676,554 | B2 | 6/2017 | Glynn | |
| 9,694,970 | B2 | 7/2017 | Oren | |
| 9,701,463 | B2 | 7/2017 | Oren | |
| 9,718,609 | B2 | 8/2017 | Oren | |
| 9,725,234 | B2 | 8/2017 | Oren | |
| 9,737,919 | B2 | 8/2017 | Hartley | |
| 9,738,439 | B2 | 8/2017 | Oren | |
| 9,758,081 | B2 | 9/2017 | Oren | |
| 9,771,224 | B2 | 9/2017 | Oren | |
| 9,790,022 | B2 | 10/2017 | Sheesly | |
| 9,796,319 | B1 | 10/2017 | Oren | |
| 9,815,620 | B2 | 11/2017 | Oren | |
| 9,834,373 | B2 | 12/2017 | Oren | |
| 9,862,551 | B2 | 1/2018 | Oren | |
| 9,902,576 | B1 | 2/2018 | Oren | |
| 9,919,882 | B2 | 3/2018 | Oren | |
| 9,963,308 | B2 | 5/2018 | Oren | |
| 9,969,564 | B2 | 5/2018 | Oren | |
| 9,988,215 | B2 | 6/2018 | Glynn | |
| 10,001,002 | B2 | 6/2018 | Fisher et al. | |
| 10,023,381 | B2 | 7/2018 | Baitaille | |
| 10,035,668 | B2 | 7/2018 | Oren | |
| 10,059,246 | B1 | 8/2018 | Oren | |
| 10,065,816 | B2 | 9/2018 | Oren | |
| 10,077,610 | B2 | 9/2018 | Pham | |
| 10,106,332 | B2 | 10/2018 | Naizer | |
| 10,138,077 | B2 * | 11/2018 | Ellis | B65G 53/4691 |
| 10,179,703 | B2 | 1/2019 | Glynn | |
| 10,301,108 | B2 | 5/2019 | Herman et al. | |
| 10,654,667 | B2 * | 5/2020 | Orban | B65G 65/425 |
| 10,858,201 | B2 * | 12/2020 | Berg | B65G 53/66 |
| 11,267,663 | B2 * | 3/2022 | Herman | B65G 41/008 |
| 2007/0089966 | A1 | 4/2007 | Gausman | |
| 2010/0040421 | A1 * | 2/2010 | Fleckten | B65G 53/528 406/39 |
| 2011/0103901 | A1 | 5/2011 | Hetcher | |
| 2012/0292257 | A1 | 11/2012 | Hartley | |
| 2012/0312662 | A1 | 12/2012 | Kowalchuk | |
| 2013/0180831 | A1 | 7/2013 | Ryder | |
| 2013/0206415 | A1 | 8/2013 | Sheesley | |
| 2014/0044508 | A1 | 2/2014 | Luharuka | |
| 2015/0044004 | A1 | 2/2015 | Pham | |
| 2015/0251108 | A1 | 9/2015 | Hartley | |
| 2016/0001989 | A1 | 1/2016 | Oren | |
| 2016/0031658 | A1 | 2/2016 | Oren | |
| 2016/0130095 | A1 | 5/2016 | Oren | |
| 2016/0236880 | A1 * | 8/2016 | Herman | B65G 3/04 |
| 2016/0244278 | A1 | 8/2016 | Oren | |
| 2016/0264352 | A1 | 9/2016 | Oren | |
| 2016/0280480 | A1 | 9/2016 | Smith | |
| 2017/0240350 | A1 | 8/2017 | Oren | |
| 2017/0267151 | A1 | 9/2017 | Oren | |
| 2017/0283165 | A1 | 10/2017 | Oren | |
| 2017/0291760 | A1 | 10/2017 | Oren | |
| 2018/0050864 | A1 | 2/2018 | Oren | |
| 2018/0065814 | A1 | 3/2018 | Eiden, III | |
| 2018/0171761 | A1 | 6/2018 | Schneider et al. | |
| 2018/0178999 | A1 | 6/2018 | Sherwood | |
| 2018/0208395 | A1 | 7/2018 | Sheesley | |
| 2018/0251324 | A1 | 9/2018 | Sucre | |
| 2018/0257857 | A1 | 9/2018 | Fisher | |
| 2018/0319585 | A1 | 11/2018 | Bataille | |
| 2018/0369762 | A1 | 12/2018 | Hunter | |
| 2020/0223648 | A1 * | 7/2020 | Herman | B65D 83/06 |
| 2022/0135352 | A1 * | 5/2022 | Herman | B65G 65/32 198/523 |

OTHER PUBLICATIONS

Henan Quanshun Flow Control Science & Technology Co. Ltd; Pneumatic Ceramic Rotary Gate Valve; qsalve.en.made-in-china. com/product/zBtnelykrsWX/China-Pneumatic-Ceramic-Rotary-Gate-Valve.html; Nov. 2019, retrieved Jun. 24, 2021.

International Search Report and Written Opinion for PCT/US20/13421, dated Apr. 20, 2020.

Meyer Industrial Solutions; Pneumatic Screw Pump; meyerindustrial.com/products/pneuamtic-screw-pump; Nov. 2019; retrieved Jun. 24, 2021.

Schenck Process Group; Pneumatic Conveying Systems for Dense Phase and Dilute-Demonstrated https://www.youtube.com/watch?v=niYQwllC9O0 Nov. 2019.

FB Industries; Atlas Conveyor, "The Unsurpassed Solution for Frac Sand Storage and Handling" Dec. 4, 2017; retrieved Jun. 24, 2021.

* cited by examiner

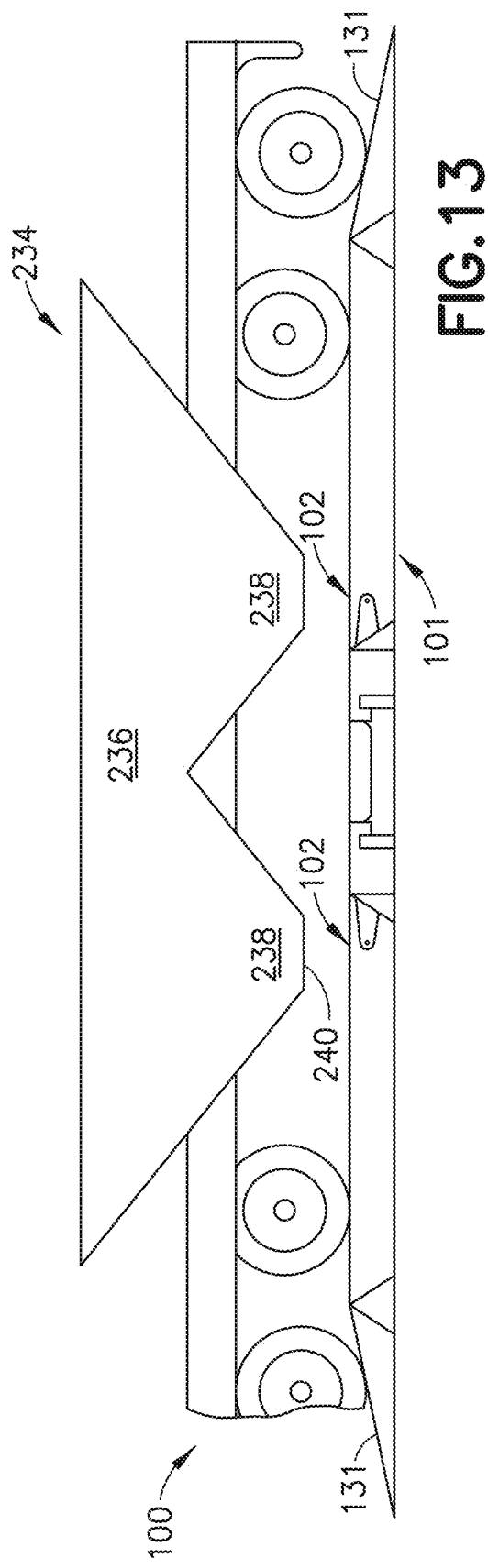
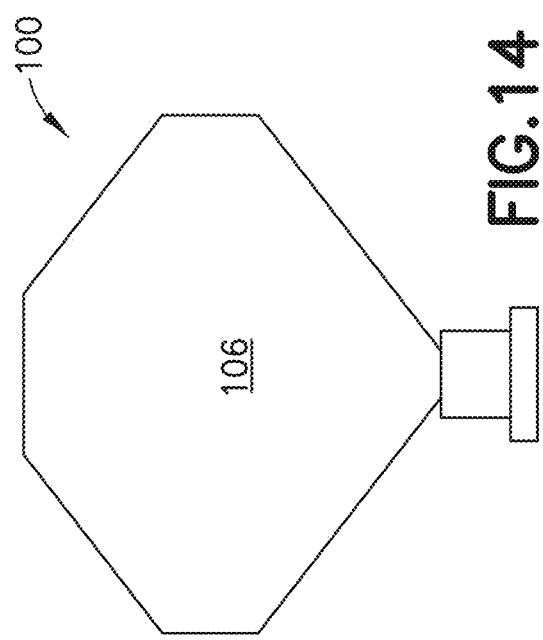

FIG. 25

FLOW CONTROL FOR BOTTOM DUMP PNEUMATIC MATERIAL HANDLING

CROSS-REFERENCE TO RELATED APPLICATION(S)

This application claims the benefit of priority to U.S. Provisional Patent Application No. 63/051,734, entitled FLOW CONTROL FOR BOTTOM DUMP PNEUMATIC MATERIAL HANDLING, which was filed on Jul. 14, 2020. The disclosure of the prior application is incorporated by reference herein in its entirety.

FIELD OF THE INVENTION

This application relates to a handling system for bulk powder or granular material, such as proppant, and methods of utilizing the proppant handling system and, more specifically, relates to flow control in a proppant handling system configured to receive a bottom dump (or gravity fed) proppant delivery and to convey that proppant delivery, pneumatically, to an off-system destination (e.g., a silo or the like).

BACKGROUND

Hydraulic fracturing (or fracking) refers to a well stimulation technique that involves injecting high-pressure fracking fluid into a wellbore to create cracks in deep-rock formations through which petroleum resources, such as oil or natural gas, can flow. Fracking fluid may vary in composition depending on a variety of considerations and the specific application to which the fracking fluid is to be applied. Typically, however, fracking fluid contains sand or some other proppant that is designed to keep any fractures produced by the fracking process open during and after the fracking process.

Proppant (e.g., sand or the like) typically is delivered to a work site (e.g., a hydraulic fracturing well head), stored temporarily at the work site in one or more silos or other types of storage containers, then, at an appropriate time, blended together with other components of the fracking fluid to form the end product to be injected into the wellbore.

A variety of other industries exist that involve handling bulk powder or granular material.

SUMMARY OF THE INVENTION

In one aspect, a material handling system includes a chassis, a conveyor system supported by the chassis and a storage container supported by the chassis. The conveyor system is configured to convey a granular material from a material unloading station to an inlet of the storage container. Multiple pods are beneath the storage container. Each pod is connected to the storage container by a corresponding pod fill line. A pneumatic conveying line is beneath the pods. The pneumatic conveying line is connected to each of the pods. Each pod has a full level sensor configured to sense when the pod is full or close to full, and an empty level sensor configured to sense when the pod is empty or close to empty.

In another aspect, a handling system for bulk powder or granular material (e.g., proppant) includes a storage container, a mechanical conveyor system, and a pneumatic conveyor system. The mechanical conveyor system is configured to convey proppant from a proppant unloading station to a conveyor system discharge that unloads into a storage container that may have an inlet that is at a higher-elevation than the proppant unloading station. The pneumatic delivery system is configured to deliver proppant from the storage container to an off-system destination (e.g., a silo or the like), pneumatically. In a typical implementation, the storage container, the mechanical conveyor system, and the pneumatic conveyor system are all on, or connected to or supported by, a common portable chassis (e.g., a trailer chassis, skid, framework, base, etc.).

In another aspect, a method is disclosed for using the handling system at a worksite (e.g., near a wellhead for a hydraulic fracking operation, where there are silos or other types of onsite proppant storage containers). The method includes providing the handling system at the worksite, receiving a delivery of material (e.g., proppant) at the handling system, conveying the material in the system to the system's storage container, and utilizing the system's pneumatic conveying system to convey the material from the storage container to an off-system destination (e.g., an onsite silo or the like).

In some implementations, one or more of the following advantages are present.

For example, in some implementations, the material handling system is able to automatically control the flow of granular material out of a storage container and into a pneumatic conveying line utilizing two or more pods connected in parallel between the storage container and the pneumatic conveying line to increase or even maximize the pneumatic conveying rate while preventing overloading (plugging).

Additionally, in some implementations, the handling system described herein provides a simple, elegant solution for conveying material (e.g., proppant) that has been delivered to a worksite via a gravity feed trailer or other container, into a silo or other onsite container, pneumatically. In this regard, many dry bulk products can be transported economically in bottom dump or end dump containers (or even in pneumatic trailers that have bottom dump capabilities) where they are unloaded via gravity flow out the lowest point of the container. At the destination it may be desirable to move the product pneumatically, into a silo or the like, to suit existing work methods and physical facilities. In various implementations, the systems and techniques disclosed herein can help facilitate achieving that goal.

Moreover, in a typical implementation, the handling system described herein can provide fairly significant advantages if it is available at a worksite (e.g., near a hydraulic fracturing wellhead site with silos and/or other onsite proppant storage containers). More specifically, having the handling system available at such a worksite would make that worksite very well suited to receive a delivery of material (e.g., proppant) from virtually any kind of conventional proppant delivery vehicle or container. If, for example, a proppant delivery arrived via a pneumatic trailer, then the proppant could simply be conveyed directly from the pneumatic trailer into any one or more of the silos or other storage containers (bypassing system 100) by using the trailer's own pneumatic delivery system. Alternatively, if the pneumatic trailer also has bottom dump capabilities, then the pneumatic trailer could be used to deliver proppant via bottom dump into the handling system. In many instances, unloading via bottom dump in reliance on gravity may be faster, and more energy efficient, than unloading in reliance on the trailer's built-in pneumatic conveying system.

If, however, a proppant delivery arrived via a gravity feed trailer (positioned over the proppant unloading station 102), then the proppant could be gravity fed into the proppant handling system and the proppant handling system can be used to convey the proppant into the silo or other off-system storage container with pneumatic power.

Likewise, if the proppant delivery arrived in a proppant delivery container, such as a container made by the SandBox Logistics™ company, then the proppant delivery container can be placed atop the proppant handling system (e.g., supported by a cradle or container unloader kit, described herein), emptied into the proppant handling system (via gravity), and the proppant handling system can be used to convey the proppant into the silo or other off-system storage container with pneumatic conveyance.

In some implementation, the delivery system described herein has some built-in redundancies that can provide a hedge against the possibility of certain system components failing, but that also can be used to throttle the system's proppant delivery rate up or down.

Moreover, in various implementations, the storage container between the truck unloading conveyor and pneumatic system provides more than just a convenient transition between one conveyor (i.e., a mechanical one) and a second conveyor (i.e., a pneumatic one). For instance, in some implementations, the storage container can provide a buffer between disparate conveying rates between the mechanical conveyor system (which may include one or more belt conveyors) and the pneumatic system. Pneumatic systems tend to be slower than mechanical conveying systems and so establishing a good transfer rate and operating it at steady state may be desirable rather than taking the slower system and then adding inefficiency by sporadic flow of product. Moreover, the storage container may allow movement of trucks between separate storage hoppers or different trucks without running the pneumatic system out of product. By its nature, unloading the trucks creates uneven flow—start/stop, move truck to next hopper, switch trucks etc. so there may be lots of non-productive time in terms of unloading. The storage container allows for a fast belt conveyor that creates a buffer of product to allow the pneumatics to operate continuously (or more continuously than the mechanical conveyor), often at a steady, optimal rate. Moreover, the storage container may allow more trucks to be unloaded, via gravity, more quickly than pneumatics would do alone.

Other features and advantages will be apparent from the description and drawings, and from the claims.

BRIEF DESCRIPTION OF THE DRAWINGS

FIG. 13 is a partial, schematic, front view of the system in FIG. 12 with ramp panels of the drive over ramp assembly in a deployed configuration, and a delivery vehicle positioned atop the drive over ramp assembly.

FIG. 14 is a partial, schematic rear view of the system of FIG. 12.

FIG. 25 is a timing diagram for one implementation of the material handling system of FIG. 19.

Like reference characters refer to like elements.

DETAILED DESCRIPTION

Figure 1:
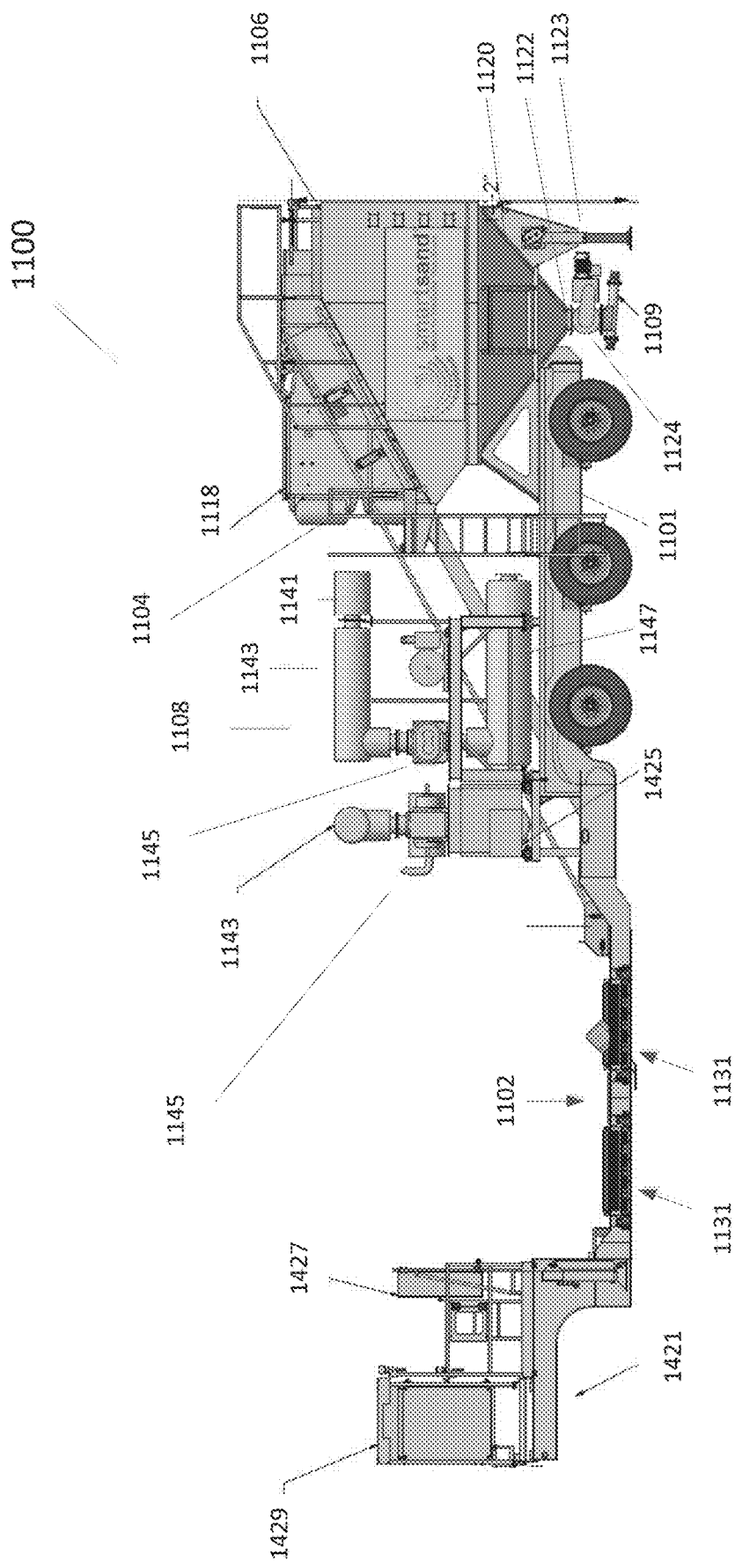
FIG. 1 is a side view of an exemplary material (e.g., proppant) handling system with ramps in a lowered position.
Figure 2:
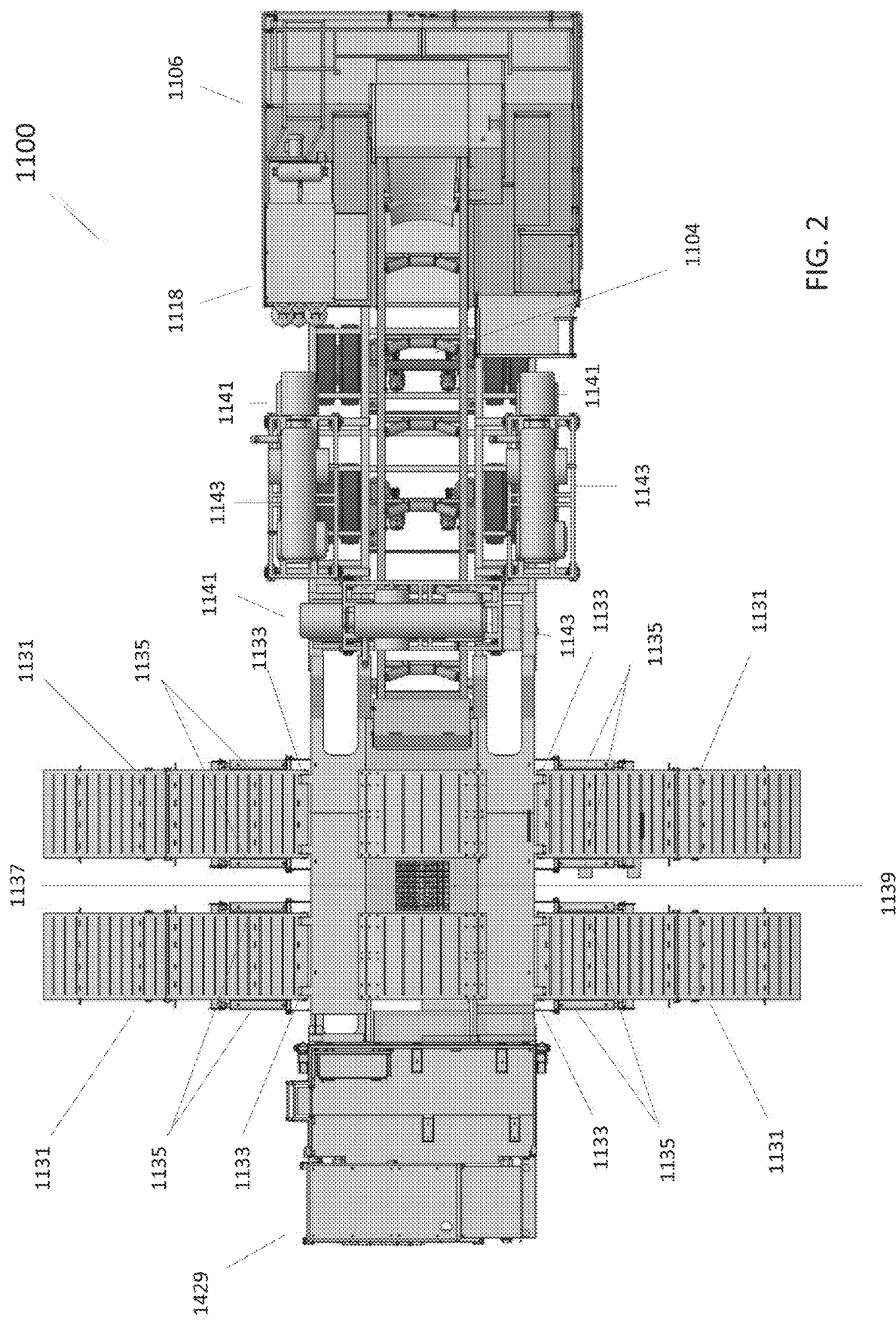
FIG. 2 is a top view of the material handling system of FIG. 1 with ramps in a lowered position.
Figure 3:
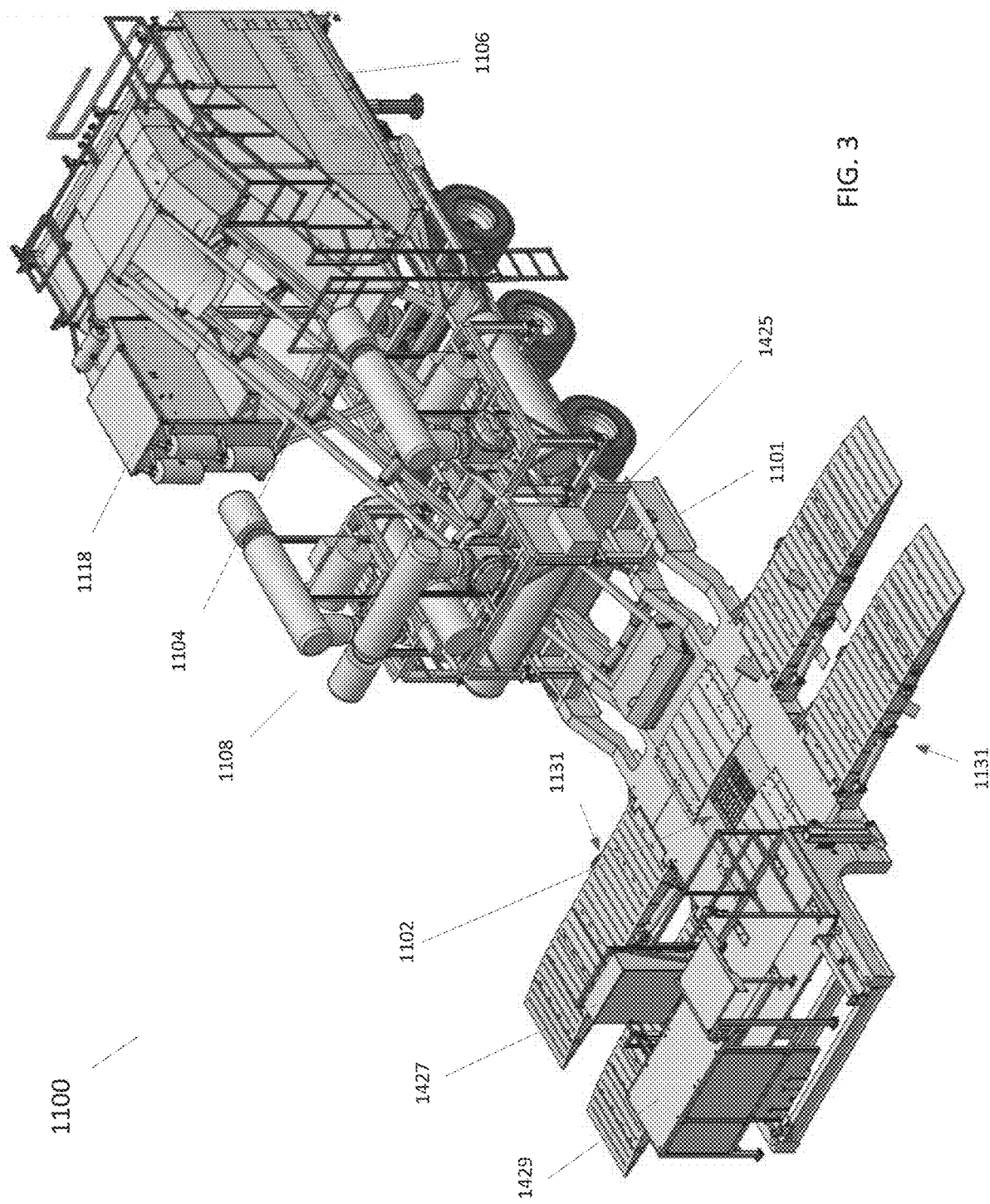
FIG. 3 is a perspective view of the material handling system of FIG. 1 with ramps in a lowered position.
Figure 4:
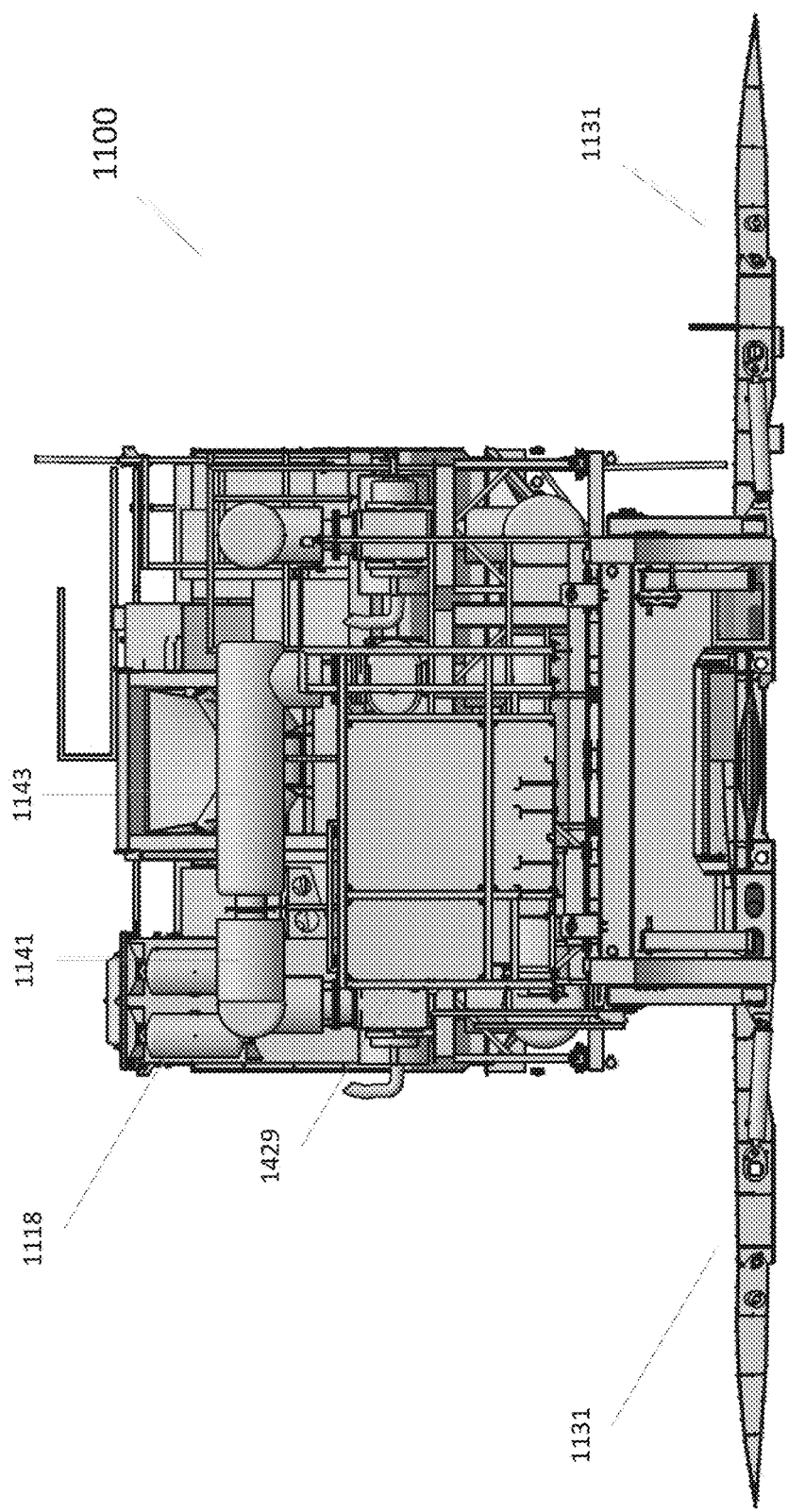
FIG. 4 is a front view of the material handling system of FIG. 1 with ramps in a lowered position.
Figure 5:
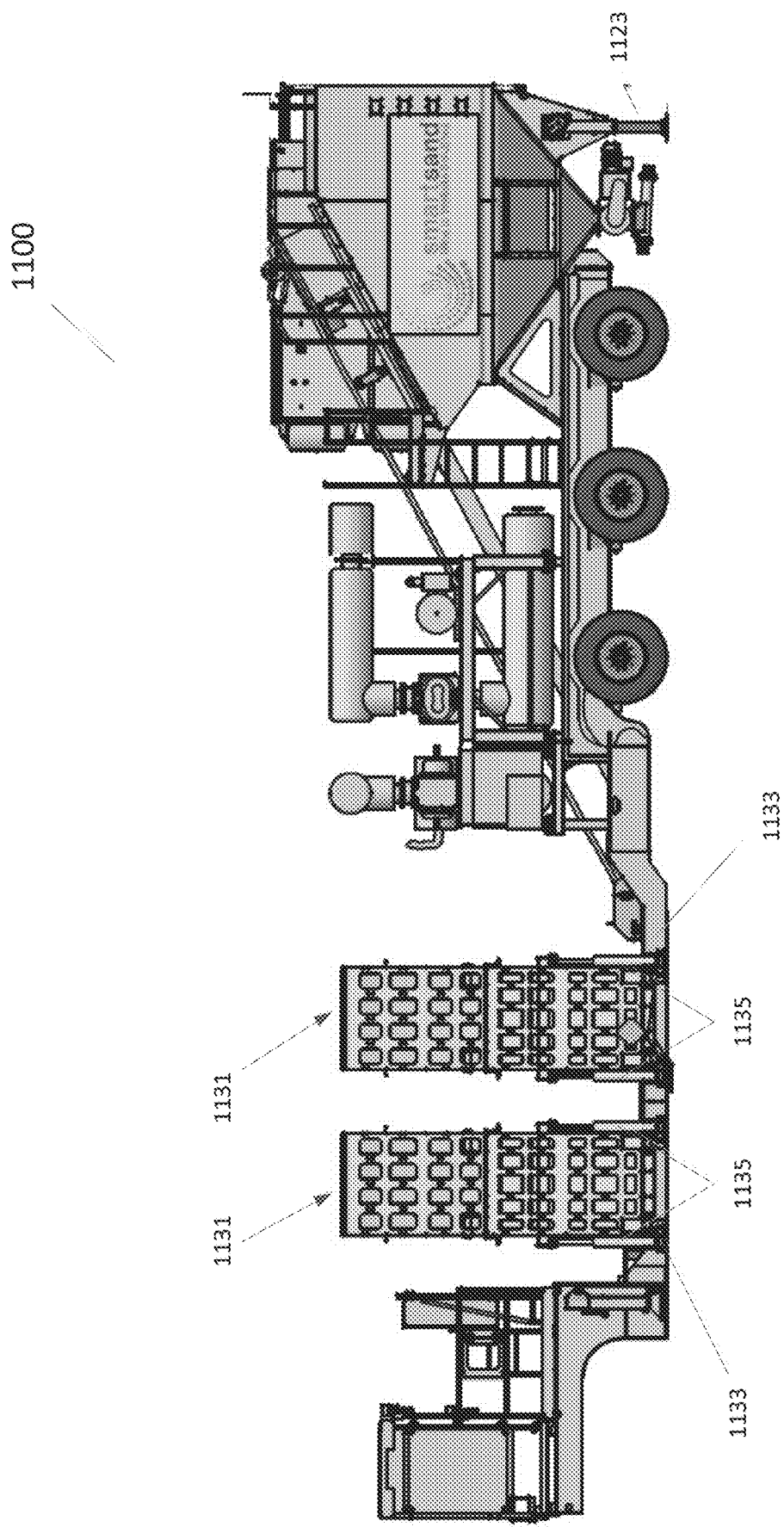
FIG. 5 is a side view of the material handling system of FIG. 1 with ramps in a raised position.
Figure 6:
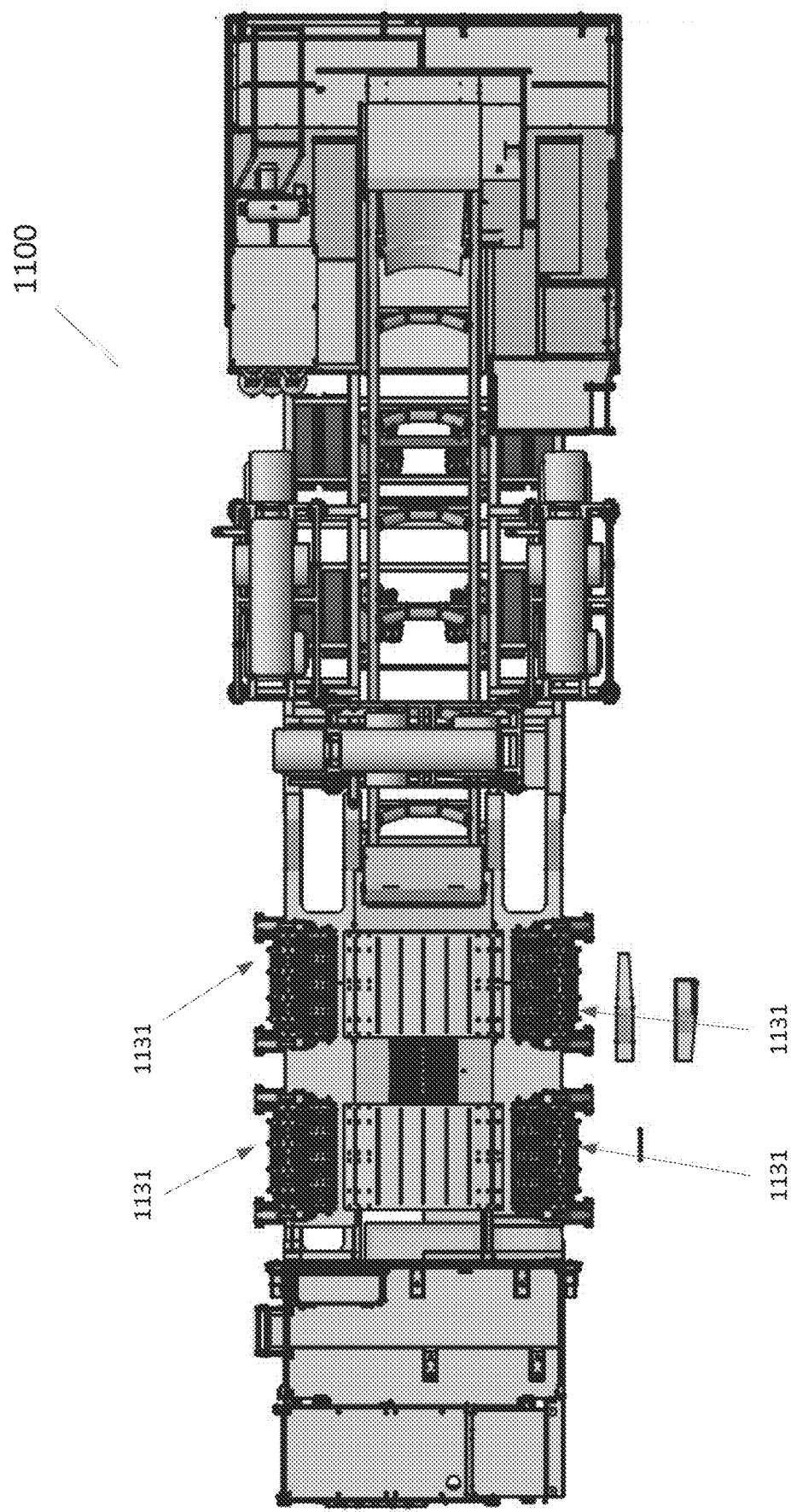
FIG. 6 is a top view of the material handling system of FIG. 1 with ramps in a raised position.
Figure 7:
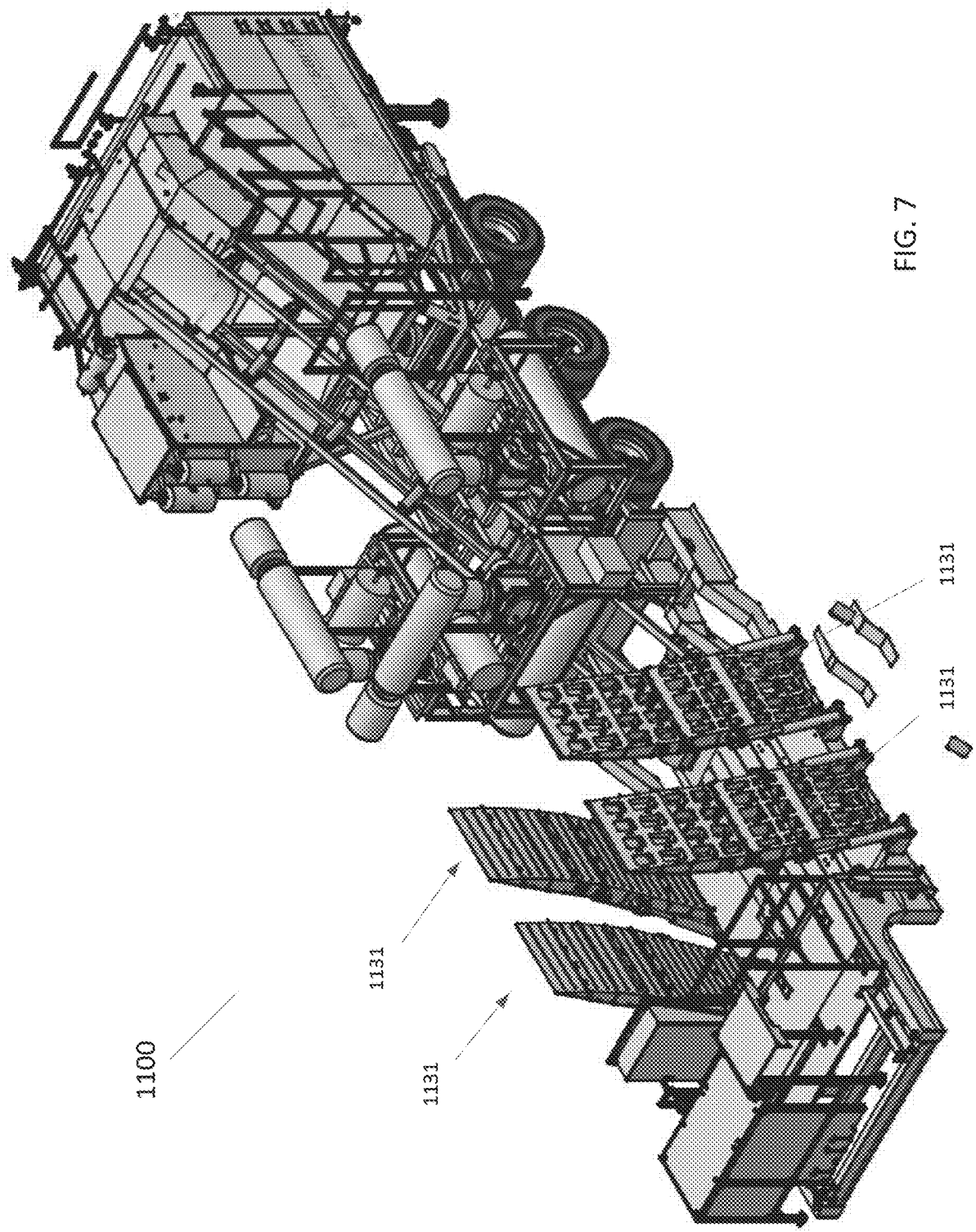
FIG. 7 is a perspective view of the material handling system of FIG. 1 with ramps in a raised position.
Figure 8:
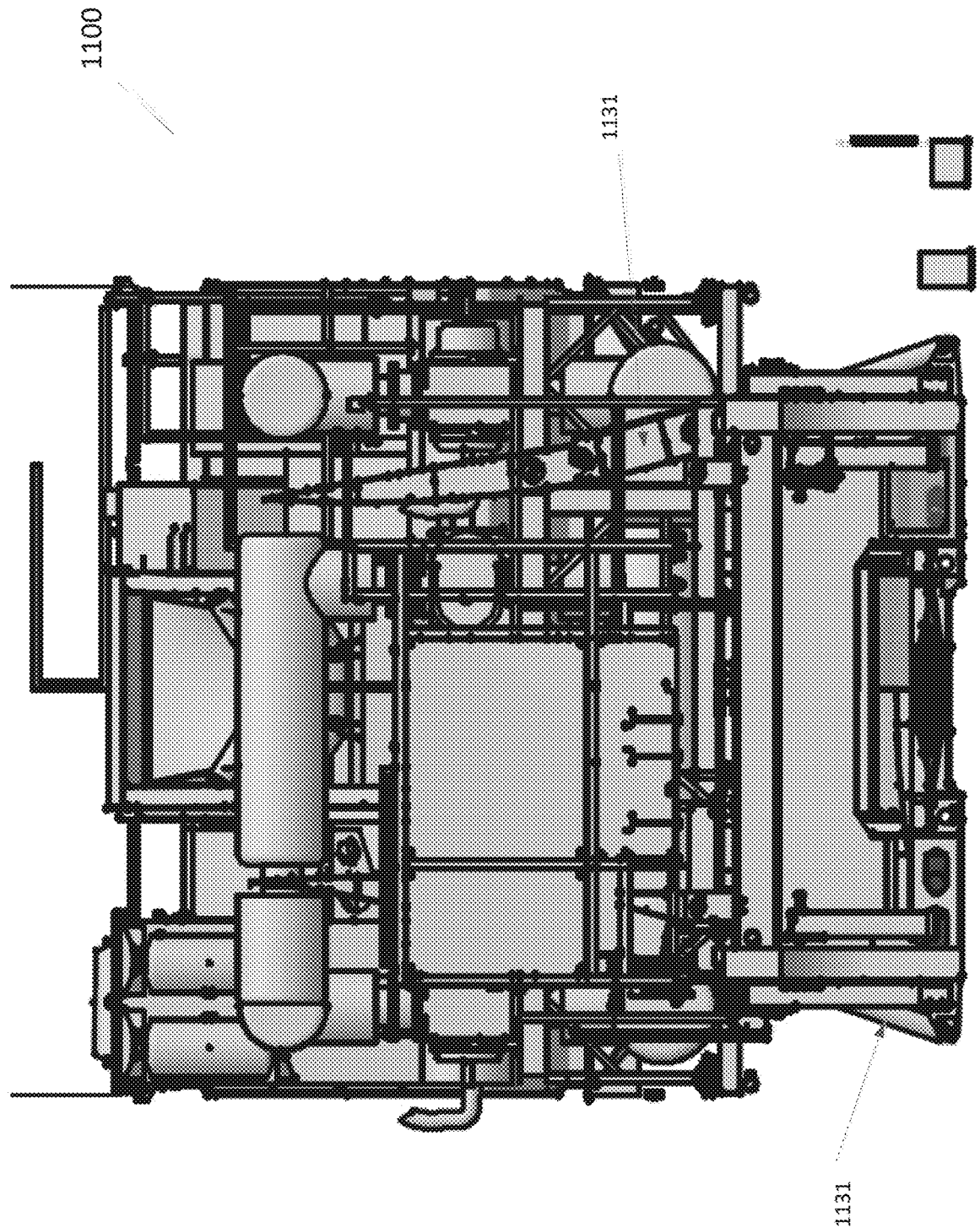
FIG. 8 is a front view of the material handling system of FIG. 1 with ramps in a raised position.

There are a variety of ways that material (e.g., proppant) can be delivered to a worksite (e.g., a wellhead in the hydraulic fracturing (fracking) industry).

One way of delivering proppant to a worksite uses pneumatic trailers that have built-in provisions for pneumatically unloading the proppant directly into an onsite silo. If proppant is delivered to a worksite using a pneumatic trailer, then the proppant usually can be off-loaded easily using the trailer's own pneumatic conveying system. The pneumatic system on the trailer, however, can be complex, costly, heavy and take up a lot of valuable space on the trailer that otherwise might be used to carry more proppant. Moreover, pneumatic conveyance can, in some instances, be slower than bottom dump gravity conveyance.

Another way of delivering proppant to a worksite uses gravity feed trailers that simply drop the proppant out of one or more openings in the bottom of the trailer under the influence of gravity. This is a relatively simple approach for delivering proppant to a worksite, and one that tends to maximize the proppant-carrying capacity of the trailer. These trailers also tend to be less expensive than pneumatic trailers and also unload faster and more efficiently than pneumatic trailers. However, if the proppant is simply dropped out of the bottom of the trailer, the worksite may need various material handling equipment to move the proppant up and into its onsite storage silos. This added equipment can be complex, costly, difficult to obtain where needed, particularly in a timely manner, and can require onsite expertise to assemble/operate.

Some pneumatic trailers also have the ability to deliver material via gravity through a hoppered opening via bottom dump in addition to pneumatic conveying capabilities.

Yet another way of delivering proppant to a worksite uses discrete proppant delivery containers, such as the type of containers available from the SandBox Logistics™ company that are able to be lifted off a delivery trailer with a forklift, for example, and placed, full of proppant, onsite for temporary storage. These types of containers can be loaded by forklift onto a cradle or container unloader kit that enables the proppant to be gravity fed from the container into a blender hopper, for example. Using these kinds of proppant delivery containers provides for a relatively simple way of delivering proppant to a worksite. However, storing the proppant delivery containers onsite requires extra storage space onsite. Moreover, various material handling equipment may be needed at the worksite to facilitate delivering proppant from the container into the blender hopper and/or into a silo. This added equipment can be complex, costly, difficult to obtain where needed, particularly in a timely manner, and can require onsite expertise to assemble/operate.

FIGS. 1-8 show an example of a material handling system 1100 that can be used at a worksite to conveniently transfer proppant, for example, from a gravity feed source (e.g., a trailer, proppant delivery container, etc., not shown in FIGS. 1-8) into a silo or other storage container onsite (also not shown in FIGS. 1-8), pneumatically.

If the illustrated system 1100 is available at a particular worksite that has one or more silos, then proppant can be easily conveyed into any of those silos, pneumatically, regardless of how the proppant was delivered to the worksite (i.e., whether the delivery was by pneumatic trailer, by gravity feed trailer, by one of the proppant delivery containers mentioned above, or by some other means). Moreover, the material handling system 1100 is portable and, therefore, can be moved around a worksite, or from worksite-to-worksite, with relative ease to deliver the proppant into silos. Of course, this portability makes the material handling system 1100 easy to stow away when not being used as well. The system 1100 also is relatively simple in design and operation.

At the outset, it should be made clear that FIGS. 1-8 show only one example of how certain aspects of the invention(s) disclosed herein may be implemented. Numerous variations are possible. Indeed, each individual component of the system 1100 shown in FIGS. 1-8 could be replaced with a different component(s) that performs substantially similarly as the component shown without departing from the spirit and scope of the invention(s). The arrangement of components also can be varied without departing the spirit and scope of the invention(s). This idea is reiterated and expanded upon throughout the specification.

The illustrated system 1100 has a chassis 1101 supported on wheels 1105. The front end of the chassis 1101 can be connected to a truck or other vehicle for hauling around as desired or needed. All other system components shown in the illustrated implementation are mounted, either directly or indirectly, onto and, therefore, supported by the chassis 1101.

The illustrated system 1100 has a proppant unloading station 1102, a mechanical conveying system 1104, a proppant holding container 1106 (or "surge bin"), and a pneumatic conveying system 1108. The proppant unloading station 1102 is configured so that a bottom dump trailed can be driven over the proppant unloading station 1102 and delivery proppant (e.g., via gravity drop) into the proppant unloading station 1102. The mechanical conveying system 1104 utilizes mechanical components (e.g., a conveyor belt assembly) to convey the proppant from the proppant unloading station 1102 up and into an opening at or near the top of the proppant holding container 1106. Belts are absent in FIG. 2, for example, but would follow the angled upward track defined by the belt supports shown. The pneumatic conveying system 1108 uses pneumatic pressure to convey proppant that is released from the bottom of the proppant holding container 1106 to a discharge 1109 near a rear of the system 1100. In a typical implementation, a hose or pipe can be attached to the discharge 1109 of the pneumatic conveying system 1108 to carry the discharged proppant to an on-site storage container, such as a silo or the like. An air lock 1124 (or functionally similar structure(s)) is provided to allow the proppant to move from the proppant holding container 1106 into the pneumatic conveying system 1108, without compromising the pressure differential between the proppant holding container 1106 and the pneumatic conveying system 1108.

The chassis 1101 in the illustrated system 1100 is a rigid structure and includes high strength, typically metallic, beams that may be welded together to form a structure or frame to support various other system components, as shown. The chassis 1101 is coupled to, and supported by, the wheels 1105 and typically includes provisions for hitching the chassis 1101 to a hauling vehicle. In a typical implementation, one or more rigid plates are provided to form platforms or walls that may be mounted to and supported by the frame structure of the chassis 1100 as well.

The chassis 1100 supports a drive-over ramp assembly 1130. The drive-over ramp assembly 1130 includes four ramp panels 1131—two on each lateral side of the chassis 1100. Each ramp panel 1131 is supported at a proximal end by a hinged connection 1133 along an upper lateral side edge of the chassis 1101 that enables the ramp panel 1131 to move, about the hinged connection 1133, between the deployed position (shown in FIG. 1-4) and a stowed (or transport) position (shown in FIGS. 5-8). In the stowed (or transport) position (shown in FIGS. 5-8), the ramp panels 1131 extend in a substantially upward (and slightly inward) direction. In the deployed position (shown in FIGS. 1-4), the ramp panels 1131 extend laterally outward and downward so that their distal ends rest on the ground, thereby forming a ramp, over which a proppant delivery vehicle can drive.

In the illustrated implementation, hydraulic rams 1135 provide the energy to move the ramp panels 1131 between the deployed position and the stowed position. Each ramp panel 1131 has two hydraulic rams 1135—one at a forward end of the ramp panel 1131 and one at a rear end of the ramp panel 1131. Each hydraulic ram 1135 has a first end that is secured to and supported by a portion of the chassis that remains stationary as the associated ramp panel 1131 moves up or down, and a second end that is secured to the ramp panel 1131 itself. In the illustrated implementation, the hydraulic rams 1135 extend to raise the ramp panels 1131 and retract to lower the ramp panels 1131.

The ramp panels 1131 are configured to facilitate a proppant delivery vehicle driving over them to position its bottom dump opening above the proppant unloading station 1102. More specifically, there is a forward-most ramp panel and a rear-most ramp panel on each side of the chassis. In the deployed position (FIGS. 1-4), the forward-most ramp panel on the left side of the chassis aligns with the forward-most ramp panel on the right side of the chassis, and the rear-most ramp panel on the left side of the chassis aligns with the rear-most ramp panel on the right side of the chassis. Moreover, the forward-most ramp panel on each respective side of the chassis is sufficiently displaced from the rear-most ramp panel on that side of the chassis such that a proppant delivery vehicle (e.g., a delivery truck with bottom dump capabilities) attempting to drive over the ramp panels will have its right side wheels supported by either the forward-most ramp panels or the rear-most ramp panels, and will have its left side wheels supported by the other of the forward-most ramp panels or the rear-most ramp panels.

Panels extend across the top of the chassis 1101 to support the wheels of a proppant delivery vehicle driving over them. These panels, together with the ramp panels 1131, collectively define two tracks to support the wheels of a proppant delivery vehicle driving over the proppant unloading station 1102. The chassis and panels supported by the chassis near the proppant unloading station 1102 define an upward-facing aperture (or opening) 1137, covered by a grating 1139, between the two tracks. The aperture 1137 is above part of the mechanical conveying system 1104. More specifically, the aperture 1137 in the illustrated implementation is above a moving conveyor belt of the mechanical conveying system 1104. As such, if a proppant delivery vehicle drives over the ramp assembly and bottom dumps a delivery of proppant into the aperture 1137 and through the grading 1139, the moving conveyor belt can immediately convey the proppant, as it is being unloaded, in a rearward direction away from just under the grating 1137. In a typical implementation, the grating helps prevent large objects (e.g., non-proppant from falling into the mechanical conveying system 1104.

The mechanical conveying system 1104 moves the unloaded proppant away from the proppant unloading station 1102 and to an opening in or near the top of the proppant holding container 1106. There are a variety of ways that the mechanical conveying system 1104 can perform this function. In one exemplary implementation, the mechanical conveying system 1104 has one or more moving conveyor belts that convey the proppant in a rearward, horizontal direction away from the proppant unloading station 1102 and then in an upwardly angled direction to the opening in or near the top of the proppant holding container 1106. In one such implementation, the mechanical conveying system 1104 has a first section of conveyor belt that extends (and moves proppant) from just under the grating 1137 in a rearward direction to a second section of conveyor belt that extends (and moves proppant) from the end of the first section in an upwardly-angled direction to the opening in or near the top of the proppant holding container 1106.

In some implementations, the conveyor belt(s) may be curved to define a lateral cross-section with a somewhat concave upper surface to discourage proppant from falling off the sides of the conveyor belt as the proppant is being conveyed. In some implementations, other measures, such as providing separate physical barriers on the sides of the conveyor belt(s), may help prevent the proppant being conveyed from falling off the sides of the conveyor belt(s). The conveyor belt(s) may be supported and/or directed, by pulleys and/or guide elements.

The conveyor belt(s) can be powered in any one of a variety ways. In a typical implementation, one or more of the pulleys for the conveyor belt is driven by prime mover, such as an electric or hydraulic motor or the like.

The upward angle of the upwardly-angled portion of the conveyor belt will depend on the specific geometry of the system 1100. In some implementations, however, the upward angle is between about 10 to 45 degrees (or more preferably between about 20 to 30 degrees) from the longitudinal axis of the chassis 1101. In one exemplary implementation, the upward angle is 28 degrees.

The mechanical conveying system 1104 has a housing 1116 that covers significant portions of the mechanical conveying system 1104. This housing 1116 helps prevent contamination from getting into the system 1100 and potentially contaminating the proppant, and also helps contain any dust that may be generated by the proppant being conveyed in the mechanical conveying system 1104. The illustrated system 1100 also has a dust collector 1118 coupled to the housing 1116 of the mechanical conveyor system 1104 to help collect dust that is generated from the proppant being conveyed in the mechanical conveying system 1104.

The dust collector 1118 can perform its function in any one of a variety of ways. In some implementations, the dust collector 1118 may be a closed loop dust collection system like the dust collector in the Quickload 300™ transloading system, available from Smart Sand, Inc. In some implementations, the dust collector 1118 may be similar to any one of the dust collectors described in U.S. Pat. No. 10,301,108, entitled Silo Dust Collection and assigned to Quickthree Technology, LLC, the owner of this application. In some implementations, the dust collector creates a low pressure, or vacuum, inside the housing 1116 of the mechanical conveying system 1104. This low pressure, or vacuum, may help draw proppant into the system 1100 through the aperture at the proppant unloading station 1102, thereby helping to contain the escape of dust from the system at the point of unloading.

At the end of the mechanical conveying system 1104, proppant is dropped into an opening at or near the top of the proppant holding container 1106. In a typical implementation, the housing 1116 of the mechanical conveying system 1104 seals against the outer surface of the proppant holding container 1106 to prevent environmental contamination from entering the system 1100 and to prevent proppant dust from escaping to the environment.

The proppant holding container 1106 is a large, hollow, rigid container. In one implementation, the proppant holding container 1106 has a storage capacity of approximately 43 tons. In another implementation, the proppant holding container 1106 has a storage capacity of approximately 40 tons. The proppant holding container 1106 has a lower surface that forms a hopper 1120 with a discharge opening (or outlet) 1122 at its bottom. In some implementations, the discharge opening 1122 at the bottom of the hopper 1120 is gated or otherwise controllable (e.g., with a valve or the like) to regulate the flow of proppant out of the proppant holding container 1106.

The pneumatic conveying system 1108 has multiple air blower assemblies 1126, each of which is configured to provide pressurized air inside the pneumatic conveying system 1108 for conveying proppant that has been released from the proppant holding container 1106 to the system discharge 1109 and beyond. Each air blower assembly 1126 has an intake air filter 1141, which is connected in series to an intake silencer 1143, which is connected in series to a blower 1145, which is connected in series to an outlet silencer 1147. The blowers 1145 are driven by prime movers, which, in the illustrated implementation, are electric motors. More specifically, the pneumatic conveying system 1108 in the illustrated implementation has three such air blower assemblies 1126.

In each air blower assembly 1126, the blower 1145 draws air into the system from the environment through the air filter 1141 and the air intake silencer 1143. The air filter 1141 filters the air entering the system 1100 to help ensure that the air passing into and through the blower 1145 and the system 1100 will be relatively free of contaminants.

The intake air silencer 1143 in each blower assembly 1126 helps reduce any air borne noise produced by the blower 1145. If the blower 1145 is a rotary positive displacement blower, for example, as the blower's impeller rotates, air is sucked into the blower, drawing slugs of air into the system 1100 at a frequency that depends on the speed and number of lobes in the impellor. The intake air silencer 1143 in this instance may serve to smooth out these slugs of air and reduce the noise emanating from the blower inlet.

The blower 1145 in each blower assembly 1126 can be virtually any kind of mechanical component that can move air. In a typical implementation, the blower 1145 is a positive-displacement blower, such as a rotary blower or a reciprocating blower. A rotary-type blower may use internal gears, screws, shuttle blocks, flexible vanes or sliding vanes, circumferential pistons, flexible impellers, helical twisted roots, or liquid-ring pumps, for example, to move the air. A reciprocating-type blower may be a piston pump, plunger pump, or diaphragm pump. Other configurations for the blower 1145 are possible as well.

The outlet silencer 1147 in each blower assembly 1126 can serve to reduce pressure pulses and generally smooth out air flow from the blower. If a blower 1145 is a rotary positive displacement blower, for example, the blower 1145 generally discharges air in compressed slugs that can be destructive to equipment downstream of the blower 1145. The outlet silencer 1147 helps reduce these pulsations, and smooth out the resulting air flow.

In various implementations, providing the system 1100 with multiple air blower assemblies 1126, as shown, provides a degree of redundancy in the system 1100. Alternatively, in some implementations, more than one of the air blower assemblies 1126 may be operated together, simultaneously, to increase the conveying capacity of the pneumatic conveying system 1108. In a typical implementation, the air blower assemblies 1126 are connected to the discharge 1109 (which in the illustrated implementation is the distal open end of a pipe) via a network of pneumatic channels, which may include pipes, hoses, and/or valves, for example.

The discharge 1109 can be connected to an external proppant delivery channel (not shown), which may be a pipe, tube, hose, etc. that can carry the proppant to a nearby silo, blender hopper, or some other on-site storage or proppant treatment container. Typically, this external proppant delivery channel would be routed to an inlet at or near the top of the silo, blender hopper, or other container. The inlet to the silo, blender hopper, or other container would usually be significantly higher than the discharge 1109 of the system 1100. Thus, the conveying capacity of system 1100 is high enough to convey the proppant to that higher point.

The proppant holding container 1106 discharges proppant from the discharge opening 1122 at the bottom of the hopper 1120. The discharged proppant passes through the air lock 1124 and into the pneumatic conveying system 1108. In general, the air lock 1124 can be any mechanical component or combination of mechanical components that allows proppant to flow out of the proppant holding container 1106 and into the pneumatic conveying system 1108, without compromising or significantly compromising the pressure differential between the proppant holding container 1106 and the pneumatic conveying system 1108.

There are numerous ways to implement the air lock 1124. Some of these are discussed below. However, the discussion below is not exhaustive. Other options are possible and fall within the scope of the current disclosure.

In some implementations, the air lock is a rotary-type air lock. Typically, a rotary-type air lock has a housing that defines an inlet, an outlet, and a rotor housing between the inlet and the outlet. The inlet of the air lock would be connected to the discharge opening of the proppant holding container 1106 and the outlet of the air lock would be connected to the pneumatic conveying system 1108. The rotor housing houses a centrally-disposed rotor shaft that can rotate and that supports a plurality of rotor vanes that extend radially outward from the rotor shaft. These rotor vanes are usually regularly spaced around a perimeter of the rotor shaft. Each vane is sized so that its distal end will be very close to, or in contact with, the inner surface of the rotor housing. The rotor shaft may be driven by a small engine or motor (e.g., electric, pneumatic, hydraulic, etc.) or any type of rotational drive. During operation, the engine or motor, for example, turns the rotor shaft, which causes the rotor vanes to rotate thereabout. Granular proppant falls, by gravity, into the inlet, and the rotating rotor vanes move the granular proppant in a downward direction into the pneumatic conveying system 1108 beneath the rotary air lock. At the same time, the close proximity or contact of the vanes to the inner surface of rotor housing help prevent pressurized air from the pneumatic conveying system 1108 from escaping through the rotary air lock and into the proppant holding container 1106. Thus, granular proppant is moved from the lower pressure proppant holding container 1106 into the higher pressure pneumatic conveying system 1108 without compromising the pressure differential therebetween.

In some implementations, the air lock is a screw-type air lock. One example of a screw-type air lock is a Meyer pneumatic screw pump, available from the Meyer Industrial Solutions company. A pneumatic screw pump is an airlock that uses a screw auger to move the proppant from a gravity feed hopper into a pneumatic conveying system. A pneumatic screw pump typically utilizes the conveyed material itself (e.g., the proppant) to form a seal between the lower pressure proppant holding container and the higher pressure pneumatic conveying system. In some implementations, the pneumatic screw pump may have a gate valve (e.g., a flap-style gate valve downstream of the screw auger) to help prevent blow-back (e.g., the screw pump is being primed and/or when the screw pump runs on empty).

In some implementations, the air lock may include gate lock valves configured, for example, in a manner described in section 3.5 of the *Pneumatic Conveying Design Guide*, by David Mills, Second Edition. The *Pneumatic Conveying Design Guide* is hereby incorporated by reference in its entirety herein. An air lock that incorporates gate lock valves typically includes two (or more) gate lock valves that alternately open and close to permit proppant to pass from the proppant holding container to into the pneumatic conveying system. Pressurized air that passes through the lower gate from the pneumatic conveying system may be vented so that it does not interfere with the material about to flow through the upper gate. These gates may be driven in any number of ways including, for example, by motor, cam or air cylinder, or gravity. The gate valves may be virtually any kind of gate valves. One such example is a pneumatic ceramic rotary gate valve, available from Henan Quanshun Flow Control Science & Technology Co., Ltd. Other variations are, of course, possible as well.

In various implementations, the air lock may be configured in any other manner that is disclosed in the *Pneumatic Conveying Design Guide*, including, for example, those described in section 3.2, entitled "Rotary Valves" of the *Pneumatic Conveying Design Guide*.

Figure 9:
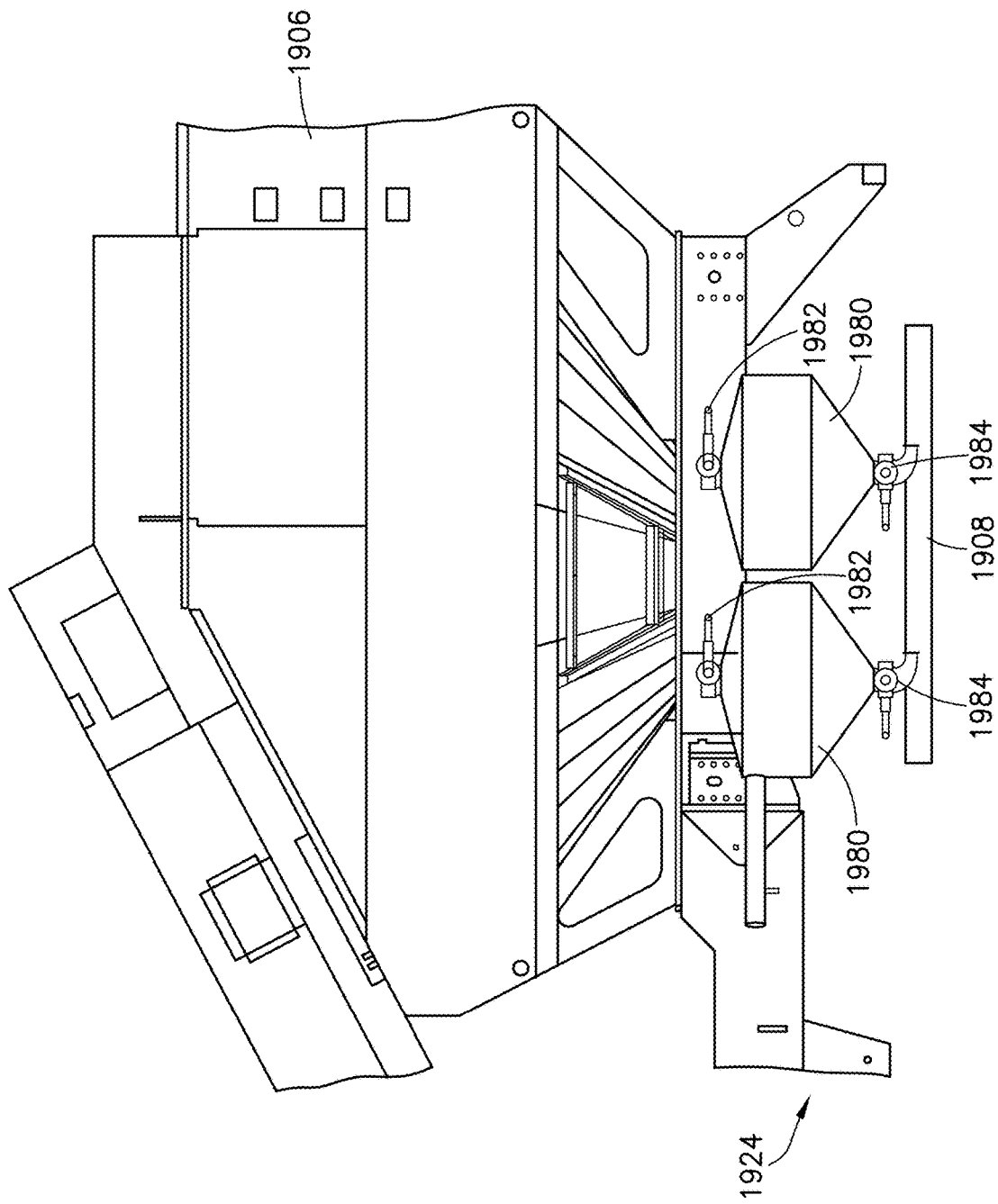
FIG. 9 is a side view showing an implementation of an air lock (that includes dual pressure tanks (pods) that can be operated in sequence) between a proppant holding container and a pneumatic conveying system.
Figure 10:
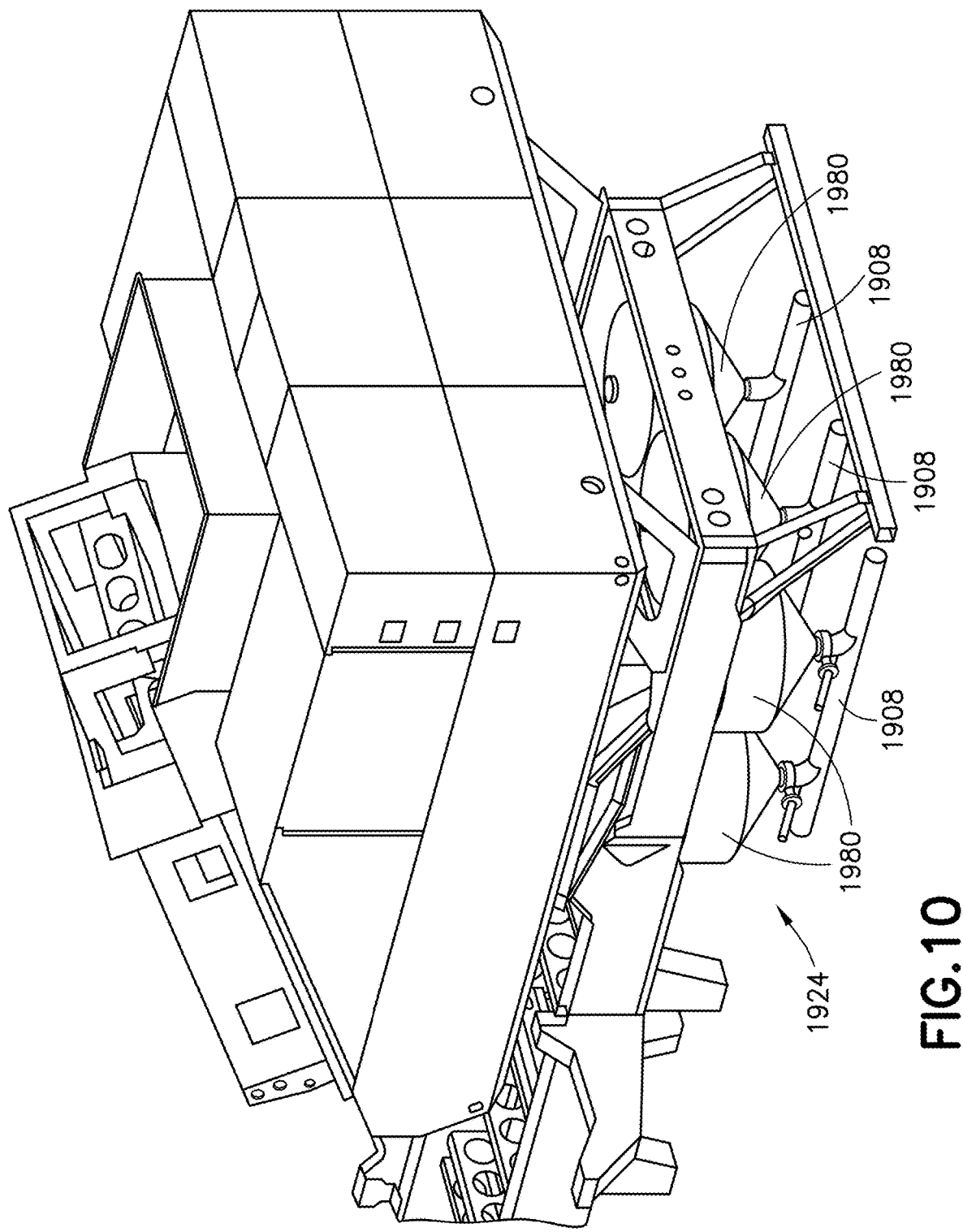
FIG. 10 is a perspective view showing an implementation of an air lock between a proppant holding container and a pneumatic conveying system.
Figure 11:
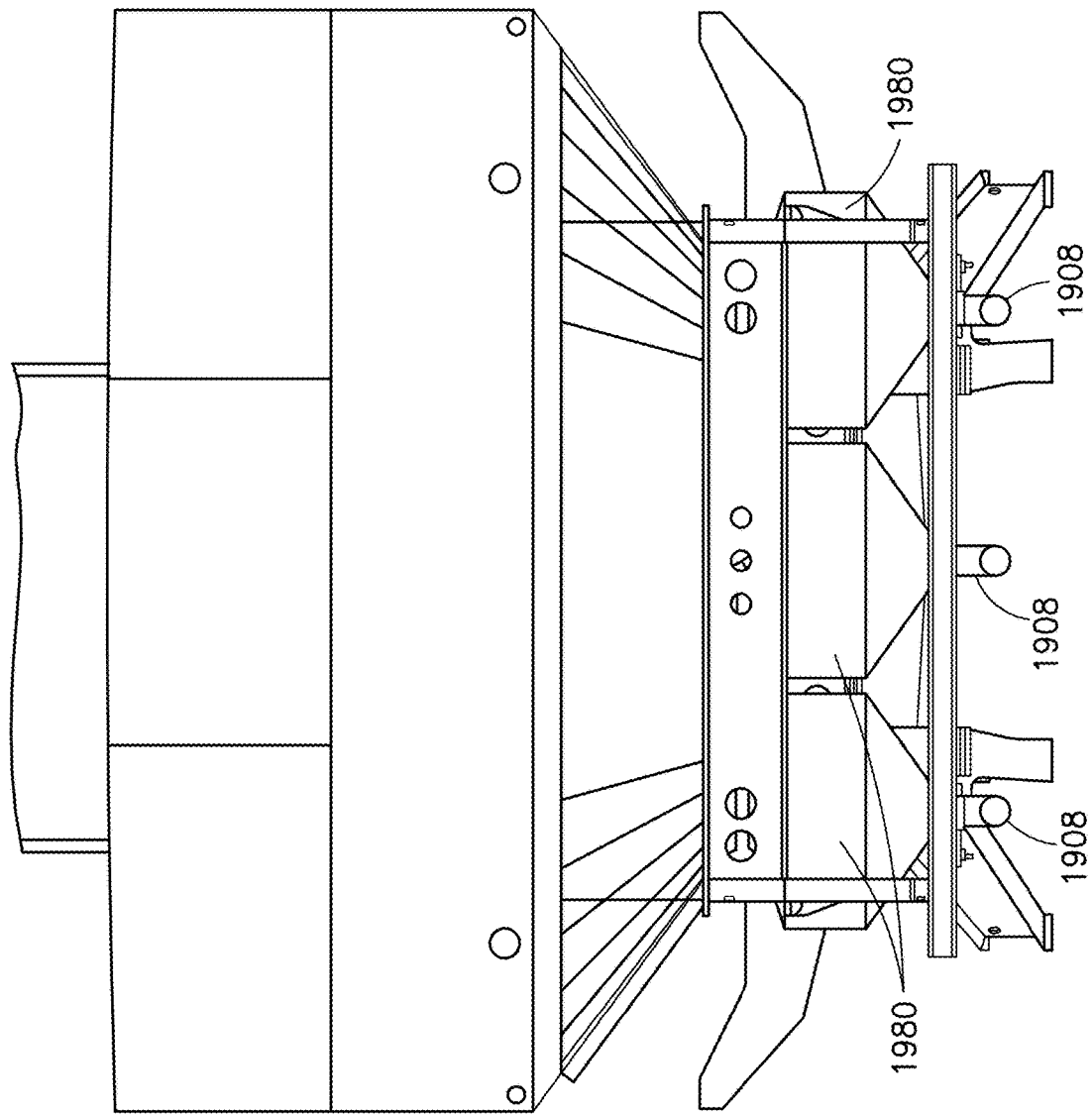
FIG. 11 is a rear view showing an implementation of an air lock between a proppant holding container and a pneumatic conveying system.

FIGS. 9-11 show an alternative implementation of an air lock 1924 between a proppant holding container 1906 (or "surge bin") and a pneumatic conveying system 1908. The illustrated air lock 1924 has multiple pressure tanks 1980 (or "pods"), each of which has an upper inlet valve 1982 and a lower outlet valve 1984. The inlet valve 1982 controls the flow of proppant from the proppant holding container 1906 into the associated tank 1980. The outlet valve 1984 controls the flow of proppant from the tank 1980 into a corresponding conveying line of the pneumatic conveying system 1908. The system also has air lines 1986 that can feed pressurized air into the tanks 1980.

In various implementations, the air lock 1924 may have single or multiple valves. One design iteration uses dual inlet and outlet valves. The purpose is that the upper valve in each pair is used to control the flow of proppant and the lower valve in each pair controls air flow. The valves have offset open and close functions so that the valve which seals airflow operates without the flow of sand occurring. This arrangement helps promote lifespan of the critical air-seal function. For example, if you close the upper valve first and stop the flow of proppant and then wait to operate the lower valve until the sand has flowed through it, it can close without cutting through the column of flowing sand. Advantageously, with the use of dual valves, the top valve cuts and stops the flow of sand and the lower valve closes free of sand and thus the seal will last a lot longer.

The illustrated implementation has three conveying lines and six pressure tanks 1980. Each pressure tank 1980 is connected via its inlet valve 1982 to the proppant holding container 1906 (e.g., typically to a hoppered outlet at the bottom of the container 1906). Moreover, each pressure tank 1980 is connected via its outlet valve 1984 to one of the conveying lines. Additionally, each conveying line is connected to two of the pressure tanks. During operation, in a typical implementation, each tank 1980 draws sand from the proppant holding container through its inlet valve (or gate) which controls the flow of proppant into the tank. Once full, the inlet valve for that gate is closed. Then, the tank may be "topped off" with pressurized air—delivered from an on-system air compressor, for example—to increase the pressure within the tank to the same pressure as the conveying line, or higher. Then, the outlet valve 1984 for that tank 1980 is opened to allow the pressurized proppant to flow into the conveying line (and out to a silo, for example). Once the tank 1980 has been emptied, the outlet valve 1984 for that tank can be closed. Then, the pressure within the tank 1980 is vented and the inlet valve 1982 can be opened again. In this regard, the system may include a vent line from each tank 1980 to allow the tank to discharge pressure prior to opening the inlet for filling. In some instances, the vent line may be connected to the dust collector In a typical implementation, the air lock 1924 may be operated by filling one tank 1980 that is attached to a particular conveying line, while unloading the other tank 1980 that is attached to that conveying line. This helps achieve more constant flow of proppant out of the system. One or more than one conveying line may be operational to convey proppant at any given time. Moreover, the opening and closing of the valves, the introduction of air into the tanks, etc. may be performed automatically by a system controller.

The illustrated system has three conveying lines, with two tanks 1980 per conveying line. This, however, can be varied considerably. For example, in some implementations, a system might include only one tank 1980 and one conveying line. In some implementations, a system might include any number of tanks 1980 with only one conveying line. In some implementations, a system might include only one tank 1980 per conveying line, but more than one conveying line. Essentially, any combination of tanks and conveying lines may be included in a particular implementation.

Returning to FIGS. 1-8, the system 1100 shown there also has an electrical generator set 1429 on a raised platform 1421 near the front end of the chassis 101. The electrical generator set 1429 may be virtually any set of components (e.g., diesel engine with an electrical generator) configured to produce electrical energy that can be used by one or more of the various components (e.g., lights, blowers, controls, etc.) in the system 1100. In some implementations, in fact, the electrical energy produced by the electrical generator set 1429 may be used to power motor(s) for the air blower(s) 1145, motor(s) for the air lock(s), and/or the ramp panels, etc. In a typical implementation, the system 1100 includes a fuel tank as well. The fuel tank also may be mounted on the raised platform, near or integrated into the electrical generator set 1429. The fuel tank supplies fuel to the internal combustion engines (typically via one or more fuel pumps).

The electrical generator set 1429 feeds the electrical energy it generates to a power distribution panel 1427, which distributes the electrical energy to any electrically-powered components in the system 1100.

The system 1100 also has an operator control panel 1425. The operator control panel 1425 can have any one of a variety of different configurations. However, in a typical implementation, the operator control panel 1425 would include all of the controls that a system operator would need access to in order to operate the system 1100. This might include controls for the electrical generator set 1429, controls for the pneumatic conveying system 1108 (including each air blower 1145), controls for the mechanical conveying system 1104, controls for the air lock(s) 1124, etc.

The system 1100 has jacks 1123 attached to the chassis 1101 and extended in a downward direction. The jacks 1123 can be retracted so that the system 1101 can be moved (e.g., hauled by a hauling vehicle). The jacks 1123 can be extended to lift the system 1101, when the system is intended to remain stationary.

In use, the system 1100 can be hauled with a hauling vehicle to a worksite that includes one or more silos for storing proppant. While being hauled, the system 1100 rolls behind the hauling vehicle on its wheels 1105. Also, while being hauled, the jacks 1123 are in raised positions and the ramp panels 1131 are as well (as shown in FIG. 5-8). When the system 1100 reaches the worksite, the jacks can be extended and the system 1100 decoupled from its hauling vehicle.

Next, the ramp panels 1131 can be lowered to the positions shown in FIGS. 1-4. In the lowered position, the ramp panels 1131 extend in an outward, slightly downward direction so that their distal ends touch the ground.

Next, a bottom dump delivery vehicle drives on the ramp panels to position its bottom dump discharge port above the upward-facing aperture (or opening) 1137. The operator turns on the mechanical conveying system 1108 and opens the bottom dump discharge port over the aperture 1137. Proppant begins pouring into the aperture 1137, through the grating 1139. The proppant is carried by the mechanical conveying system 1104 into the proppant holding container 1106.

A hose, or the like, is attached to the discharge 1109 of the pneumatic conveying system 1108 and routed into one of the on-site silos. The pneumatic conveying system 1108 and the air lock(s) 1124 are started. Then, the proppant is released (e.g., by opening a valve) from the proppant holding container 1106. The proppant passes through the air lock and into a conveying line of the pneumatic conveying system 1108, which carries the proppant through the conveying line, then through the hose to the on-site silo.

Figure 12:
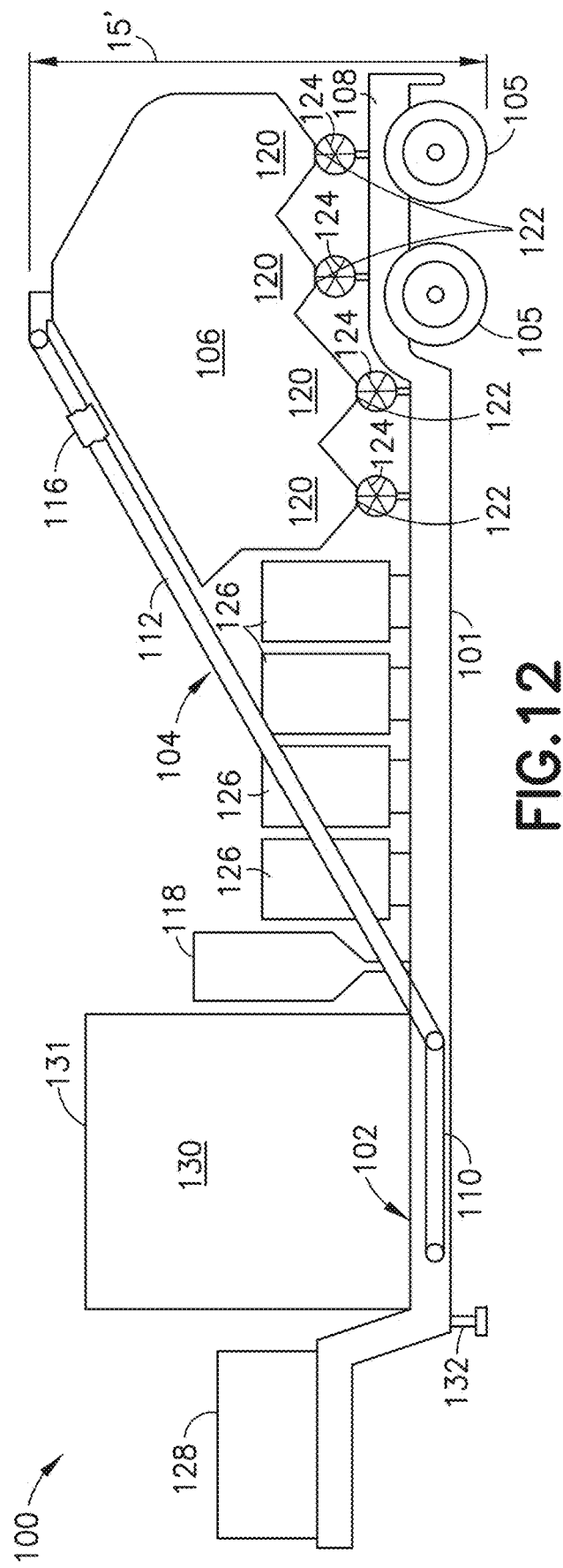
FIG. 12 is a schematic side view of another implementation of a material (e.g., proppant) handling system.

FIGS. 12-14 show another example of a material handling system 100 that can be used at a worksite to conveniently transfer proppant, for example, from a gravity feed source (e.g., a trailer, proppant delivery container, etc.) into a silo or other storage container onsite, pneumatically.

If the illustrated system 100 is available at a particular worksite that has one or more silos, then proppant can be easily conveyed into any of those silos, pneumatically, regardless of how the proppant was delivered to the worksite (i.e., whether the delivery was by pneumatic trailer, by gravity feed trailer, by one of the proppant delivery containers mentioned above, or by some other means). Moreover, the material handling system 100 is portable and, therefore, can be moved around the worksite with relative ease to deliver the proppant into any one of the one or more silos. Of course, this portability makes the material handling system 100 easy to stow away as well.

Like the system 1100 in FIGS. 1-8, the system 100 in FIGS. 12-14 is relatively simple in design and operation and highly portable.

In the illustrated implementation, the system 100 has a chassis 101 on wheels 105. The chassis 101 can be connected to a truck or other vehicle for hauling around as desired or needed. All other system components shown in the illustrated implementation are mounted, either directly or indirectly, onto and, therefore, supported by the chassis 101.

The illustrated system 100 has two proppant unloading stations 102, two mechanical conveying systems 104, a proppant holding container 106, and a pneumatic conveying system 108.

Each proppant unloading station 102 is configured to receive proppant from above (e.g., via gravity drop from a bottom dump trailer or container positioned above the proppant unloading station 102). Each proppant unloading station 102 includes a portion of one of the mechanical conveying systems 104 that is exposed from above so that when a proppant delivery vehicle, for example, is positioned above the proppant unloading station 102, the proppant delivery vehicle can bottom dump proppant onto the mechanical conveying system 104 for mechanical conveying.

Each mechanical conveying system 104 is configured to convey proppant from an associated one of the proppant unloading stations 102 to an opening in the proppant holding container 106. The pneumatic conveying system 108 is configured to pneumatically convey proppant from the proppant holding container 106 to one or more off-system destinations (e.g., a silo, blender hopper, etc.).

The chassis 101 in system 100 is a rigid structure made up of high strength, typically metallic, beams that may be welded together to form a structure or frame to support various other system components, as shown. The chassis 101 is coupled to wheels 105 and typically includes provisions for hitching the chassis 101 to hauling vehicle. In some implementations, the chassis 101 may have one or more rigid plates mounted on the frame structure as well. The chassis 101 in the illustrated implementation defines an opening or space, through which the proppant can be dropped from a delivery vehicle or container into the system 100 at the proppant unloading station 102.

Each mechanical conveying system 104, in the illustrated implementation, has a first powered belt conveyor 110 and a second powered belt conveyor 112. Each powered belt conveyor 110, 112 has a pair of pulleys and a belt coupled to the pulleys. In a typical implementation, the pulleys may be driven by prime movers, such as electric motors, etc. In some implementations, there is a single, continuous belt conveyor that has both a lower horizontal and upper angled portion.

Each first powered belt conveyor 110 extends from the proppant unloading station 102, in a rearward, substantially horizontal direction to a second powered belt conveyor 112. Each second powered belt conveyor 112 is very close to an end of its corresponding first powered belt conveyor 110 and configured such that proppant that is carried by the first powered belt conveyor 110 will be passed along to or dropped onto the second powered belt conveyor 112. In some implementations, the second powered belt conveyor could be a conveyor with a bend in it so that it has one horizontal section which transitions into a sloped/elevated section. Each second powered belt conveyor 112 extends away from the first powered belt conveyor 110 in a rearward, upwardly angled direction to a conveyor system discharge 114 that discharges, according to the illustrated implementation, into the top of the proppant holding container 106.

The specific upward angle of each second powered belt conveyor 112 will depend on the specific geometry of the system 100. In some implementations, however, the upward angle may be between about 10 to 45 degrees (or more preferably between about 20 to 30 degrees) from the longitudinal axis of the chassis 101. In one exemplary implementation, the upward angle is 28 degrees.

Each mechanical conveying system 104 has a housing 116 (that may be built-in) that covers portions of the first powered belt conveyor 110 and that covers the second powered belt conveyor 112. This housing 116 helps contain any dust that may be generated by proppant moving along on the conveyor belts of the mechanical conveying system 104. There is an opening in the housing 116 above the first powered belt conveyor 110 at the proppant unloading station 102. It is through this opening that the proppant can be delivered into the system 100.

Each mechanical conveying system 104 has a dust collector 118 that is coupled to (and that may be built-into) the housing 116 of the mechanical conveyor system 104. The dust collector 118 is generally configured to draw air and dust out of housing 116 for the mechanical conveyor system 104, via vacuum. The dust collector 118 may be a closed loop dust collection system like the dust collector in the Quickload 300™ transloading system, available from the Smart Sand, Inc. Company.

In some implementations, each dust collector creates a low pressure, or vacuum, in the housing 116 of its mechanical conveying system 104. In some implementations, this low pressure, or vacuum, may help draw proppant into the system 100 at the corresponding proppant unloading station 102.

The upper end of the housing 116, in the exemplary implementation shown in FIG. 12, bends slightly downward and extends into the top of the proppant holding container 106. The second powered belt conveyor 112 ends near this point so that the proppant carried up the second powered belt conveyor 112 will fall off the end of the second powered belt conveyor 112 and into the proppant holding container 106.

The proppant holding container 106 is a large, hollow, rigid container. In one implementation, the proppant holding container 106 has a storage capacity of approximately 43 tons. The proppant holding container 106 has a lower surface that forms a plurality of hoppers 120 (e.g., three), each of which has a corresponding discharge opening (or outlet) 122 at its bottom. The specific implementation shown in FIG. 12 has four hoppers formed in the bottom of the proppant holding container 106, and the hoppers are aligned with one another front-to-back. In some implementations, the discharge opening 122 at the bottom of each hopper 120 may be gated or otherwise controllable to regulate the flow of proppant out of the proppant holding container 106.

The discharge opening 122 at the bottom of each hopper 120 is connected to an air lock 124. Each air lock includes one or more mechanical components configured to allow the movement of proppant from the proppant holding container 106 into the pneumatic conveying system 108, without compromising the pressure differential between the proppant holding container 106 and the pneumatic conveying system 108. The air locks 124 can be or include virtually any kind of mechanical component or combination of mechanical components that can perform the foregoing air lock functionalities. For example, the air locks 124 can be screw-type air lock, rotary air locks of the kind that are used for discharging solid material from hoppers, bins, etc. into pressure or vacuum-driven pneumatic conveying systems.

During operation, proppant flows out of the proppant holding container 106, through one or more of the air locks 124, and into one or more proppant conveying channels (not shown in FIG. 12) of the pneumatic conveying system 108.

The pneumatic conveying system 108 has three air blowers 126 that are configured to blow air into one or more proppant conveying channels. In some implementations, the pneumatic conveying system 108 has a system of valves that facilitate connecting the various air blowers 126 to various proppant conveying channels. Each proppant conveying channel has a system output that can be connected to an external proppant delivery pipe or tube (not shown). In a typical implementation, the external proppant delivery pipe or tube may be routed to an off-system silo, a blender hopper, or other container.

The air blowers 126 are driven by prime movers. The prime movers can be internal combustion engines, electric motors, etc. In one exemplary implementation, each air blower 126 has a capacity between about 800 and 1180 cubic-feet per minute and is driven by a 100-horsepower diesel engine. In an exemplary implementation, the system 1100 may be configured to deliver 0.5-0.6 tons per minute with three air blowers and three airlocks. In some implementations, the air blowers 126 may be driven by electric motors powered by an electrical generator set, which may be supported on the chassis (e.g., on a front trailer gooseneck). There is a fuel tank 128 mounted on a raised section of the chassis 101 near the forward end of the chassis 101. The fuel tank 128 is configured to supply fuel to the internal combustion engines that drive the air blowers 126. In some implementations, the fuel tank 128 may be configured to provide fuel to operate an electrical generator (not shown) and/or one or more engines to drive the air lock(s) and/or other components of the system 100.

The system 100 has a drive-over ramp assembly 130. The drive-over ramp assembly 130 has a pair of ramp panels 131. Each ramp panel 131 extends from a hinged connection along a lateral edge of the chassis 101. The ramp panels 131 are movable, about its hinged connection, between a stowed (or transport) position (shown in FIG. 12) and a deployed position (shown in FIG. 13). In the stowed (or transport) position (shown in FIG. 12), the ramp panels 131 extend in a substantially upward direction. In the deployed position (shown in FIG. 13), the ramp panels 131 extend laterally outward and downward so that their distal edges rest on the ground, thereby forming a ramp, over which a proppant delivery vehicle (see, e.g., FIG. 13) can drive. When the proppant delivery vehicle (with one or more bottom delivery chutes, shown in FIG. 13) has driven onto the ramp, the bottom delivery chute(s) of the proppant delivery vehicle can be aligned with (and positioned directly above) the proppant unloading station(s) 102. In some implementations, the ramp panels 131 are moved by one or more electrical motors and/or hydraulically (or otherwise).

In some implementations, the ramps (ramp panels) could be made as separate units which get placed in position (as shown in FIGS. 1-4, for example) at the worksite via a forklift, for example. The ramps do not necessarily need to be part of single physical unit with the rest of the system components.

In some implementations, the system 100 may include a rigid framework (not shown in FIGS. 12-14) supported by, or integrated into, the chassis 101 that is configured to receive and support a proppant delivery container, such as those available from SandBox Logistics™ or the like above the proppant unloading station(s) 102. This framework may be provided instead of, or in addition to, the drive over ramp assembly 130. In implementations that include this kind of framework, the proppant delivery container may arrive at the worksite on a delivery trailer, lifted off of the trailer with a forklift, for example, and then placed directly onto the framework for gravity unloading directly into the system 100. Once emptied, the proppant delivery container may be lifted, again by forklift, and put onto a truck to be taken away, or placed somewhere else for temporary storage until it is ready to be hauled away.

The system 100 shown in FIGS. 12-14 is supported on the ground by wheels in the rear and by a separate support element 132 in the front.

FIG. 13 is a partial, schematic front view of the system 100 in FIG. 12 showing the ramp panels 131 of the drive over ramp assembly 130 in a deployed configuration, and a proppant delivery vehicle 234 positioned atop the drive over ramp assembly 130. FIG. 13 shows that the two proppant unloading stations 102 are located on opposite lateral side of the chassis 101.

In the deployed configuration, the ramps of the drive over ramp assembly 130 extend in a laterally outward and slightly downward direction from the chassis 101. The distal edge of each ramp is in contact with the ground upon which the system 100 is located. Thus, it can be seen that the drive over ramp assembly 130, when deployed, forms a ramp that a proppant delivery vehicle (e.g., 234) can drive up from one side (to the position shown in FIG. 13) and down on the other side.

The exemplary proppant delivery vehicle 234 in FIG. 13 has a proppant storage container 236 with a bottom surface having two hopper sections 238, each of which has a discharge opening 240 at its bottom. With the proppant delivery vehicle 234 positioned atop the drive-over ramp assembly 130, as shown, each discharge 240 aligns with one of the proppant unloading stations 102.

In one exemplary implementation, each engine-blower air lock unit will convey about 0.6 of a Ton/minute. So, 4 can convey up to 2.4 tons/minute for the entire unit. Moreover, in an exemplary implementation, the design consists of a 53 ft. trailer with a drive over 48 inch (or 36 inch) wide belt conveyor with fold out drive over ramps, an approximately 43 ton storage hopper, a conveyor unload rate into the storage compartment of approximately 8 tons/minute, with three rotary air locks mounted to the hoppered storage compartment, and three approximately 100 HP diesel engines driving 900 cfm blowers, available from Gardner Denver (screw type tend to be much quieter and more dependable) and a small hydraulic pump to drive the rotary air lock(s). Moreover, the design can include hydraulic dolly legs to lower the trailer to the ground in order to facilitate the drive over ramp functionality. The system width is approximately 12 feet and its height is approximately 14 feet. These are transport dimensions, not working dimension. Each blower is connected to a rotary drop out air lock. This provides redundancy, so that if one engine or airlock fails, two others would be interchangeable with each other.

Adding multiple blowers and airlocks provides modular addition of transfer rate which increases incrementally to suit requirements of the user.

Figure 15:
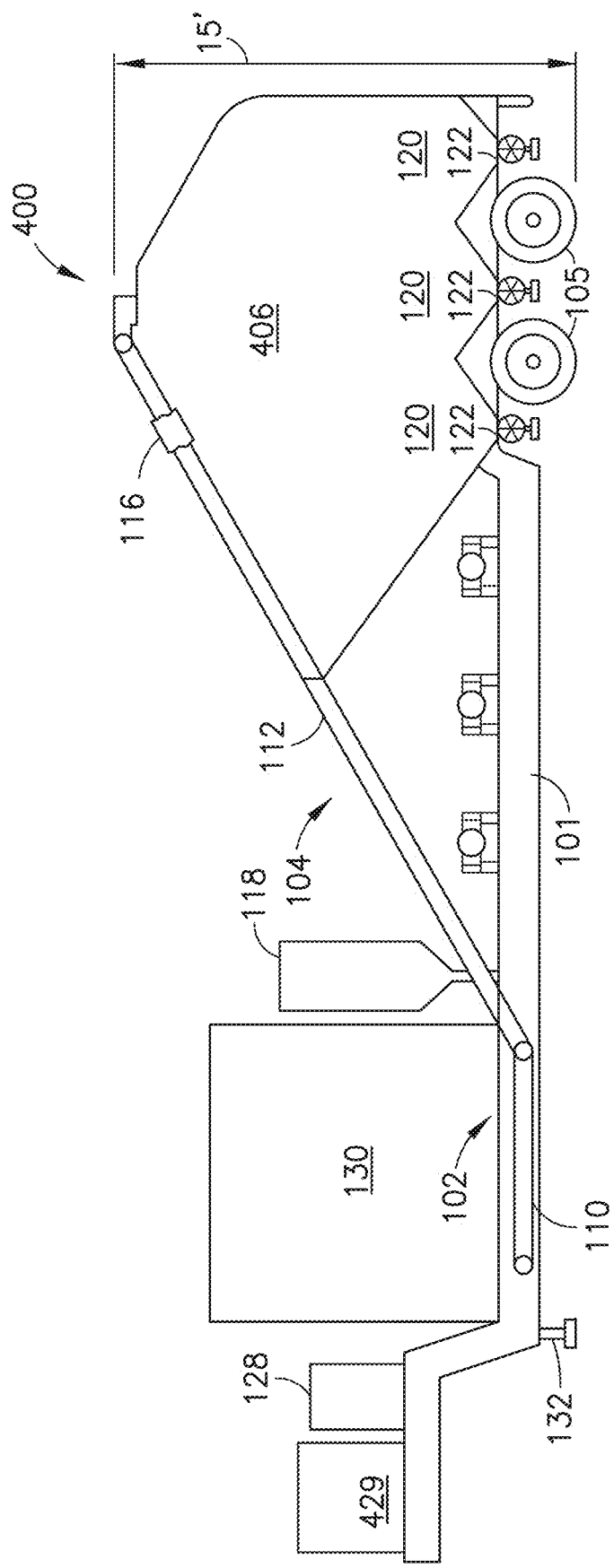
FIG. 15 is a schematic side view of yet another alternative implementation of a material (e.g., proppant) handling system.
Figure 16:
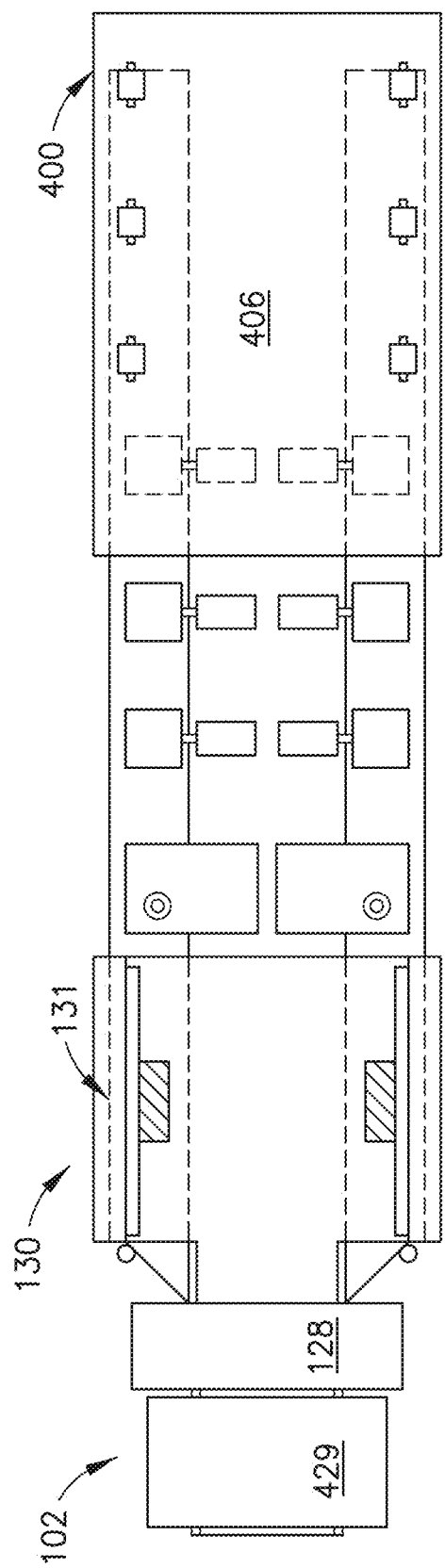
FIG. 16 is a schematic, top, partial section view of the system in FIG. 14.
Figure 17:
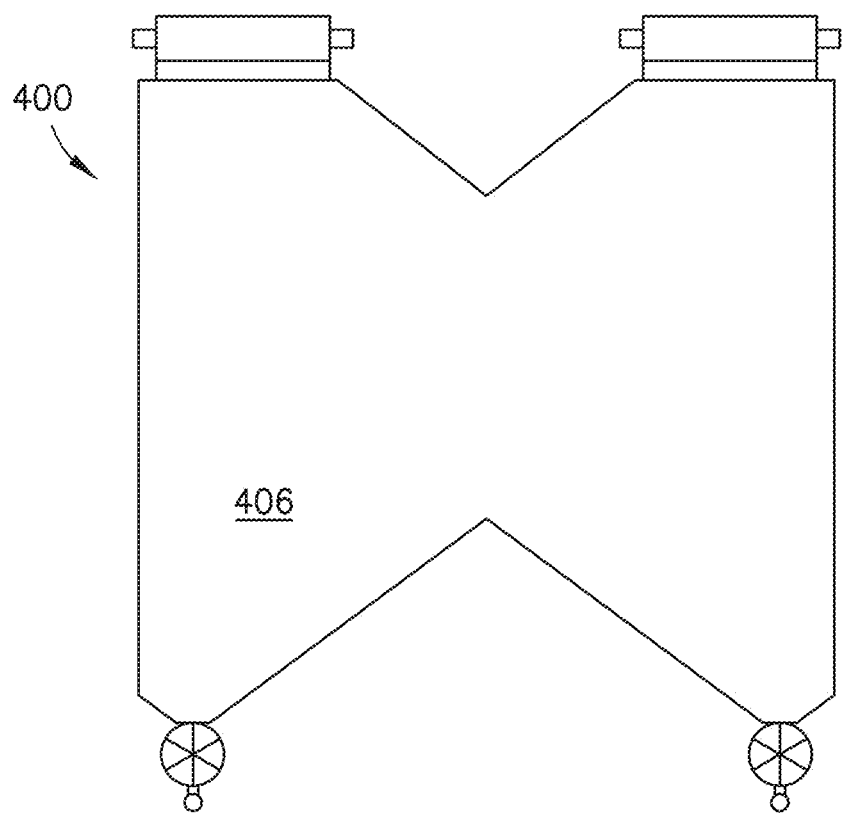
FIG. 17 is a partial, schematic rear view of the system of FIG. 14.

FIGS. 15-17 show an alternative proppant handling system 400 that can be used at a worksite to conveniently transfer proppant from a gravity feed trailer or proppant delivery container into a silo or other storage container onsite, pneumatically.

The proppant handling system 400 in FIGS. 15-17 is similar in some ways to the proppant handling system 100 in FIGS. 12-14. For example, the proppant handling system 400 in FIGS. 15-17 has two proppant unloading stations 102, two mechanical conveying systems 104, a proppant holding container 106, and a pneumatic conveying system 108. Each proppant unloading station 102 is configured to receive proppant from a gravity feed trailer or container positioned above the proppant unloading station 102. Each mechanical conveying system 104 is configured to convey proppant from an associated one of the proppant unloading stations 102 to an opening in the top of the proppant holding container 106. The pneumatic conveying system 108 is configured to pneumatically convey proppant from the proppant holding container 106 to one or more off-system destinations (e.g., a silo, blender hopper, etc.).

The proppant handling system 400 in FIGS. 15-17 differs from the proppant handling system 100 in FIGS. 12-14 in at least a few notable ways.

First, for example, the number and specific arrangement of components in the proppant handling system 400 is different than the number and specific arrangement of components in the proppant handling system 100 in FIGS. 12-14. More particularly, in system 400, there are six air blowers 126 and six air locks 124. The six air blowers 126 are arranged with three on each lateral side of the chassis 101. Each air blower 126 is driven by an electrical motor. Likewise, the six air locks 124 are arranged with three on each lateral side of the chassis 101. The proppant holding container 406 in system 400 has a lower surface that forms six hoppers 120, each of which has a corresponding discharge opening (or outlet) 122 at its bottom, and each of which is aligned with (and connected to) a corresponding one of the air locks 124.

In various implementations, the system 400 will include valves that enable any one of the six air blowers 126 and six air locks to be connected to the same pneumatic conveying channel(s).

Another example of how the proppant handling system 400 of FIGS. 15-17 differs from the proppant handling system 100 of FIG. 12-14, is that the proppant handling system 400 has an electrical generator set 429 together, with the fuel tank 128, on a raised section of the chassis 101 near the forward end of the chassis 101. The fuel tank 128 supplies fuel to an internal combustion engine of the electrical generator set 429. The electrical generator set 429 produces electricity that can be used to power any one or more of the other system components, including, for example, the air blowers 126, the air lock(s), the ramp panels, etc.

In some implementations, the proppant pneumatic transfer rate of the system 400 is in the 3.6 ton per minute range with approximately 70 tons of storage. This equals about 20 minutes of sand conveying if trucks are not available; or equivalently a 28-ton truck load may be unloaded in less than 8 minutes.

Figure 18:
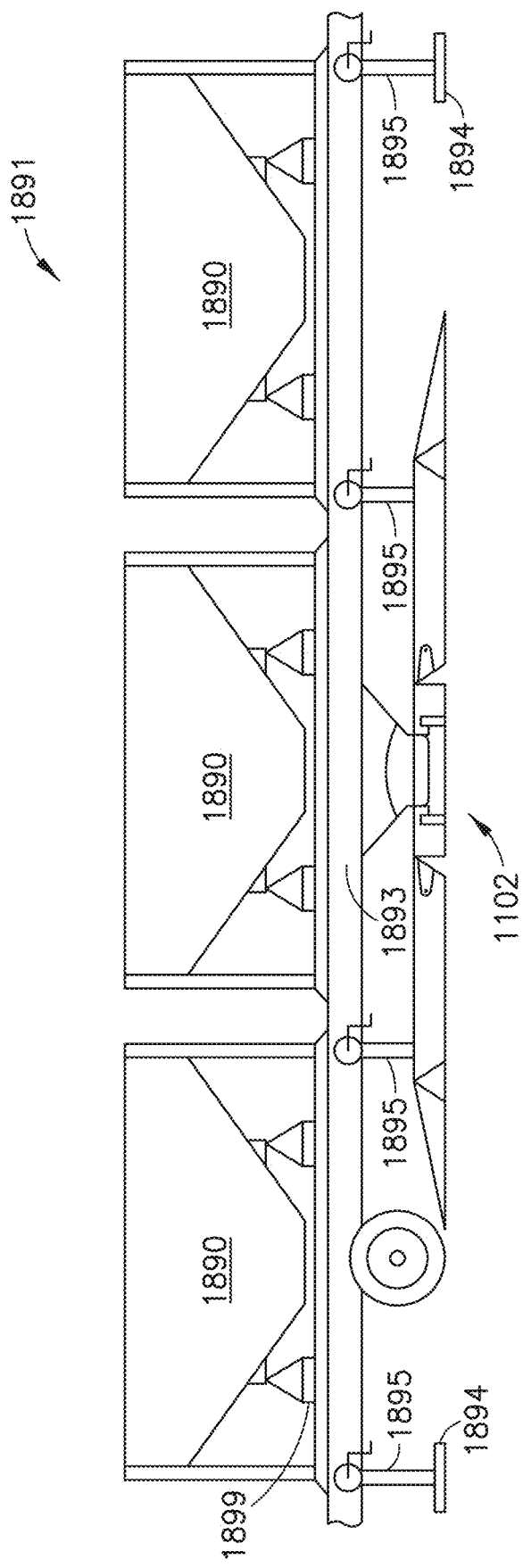
FIG. 18 is a schematic front view showing an implementation of an unloader kit for unloading a proppant delivery container.

FIG. 18 shows an unloader kit 1891 for unloading a proppant delivery container, such as a container made by the SandBox Logistics™ Company, into a system like the ones disclosed herein. More specifically, the illustrated implementation shows three such proppant delivery containers 1890. Each proppant delivery container has a bottom surface that defines pockets 1899 for a forklift to engage, so that the forklift can lift the proppant delivery container 1890 onto and off of the unloader kit 1891.

The unloader kit 1891 can be attached to a hauling vehicle and hauled. The hauling vehicle would be coupled to the front of the unloader kit 1891 (which is on the right side of the image as shown) and would roll on its axle 1892 at a rear end thereof (the left side of the image as shown). The unloader kit 1891 is shown positioned over the ramp panels and unloading station of a system (e.g., system 1100).

The unloader kit 1891 has a platform 1893 that supports the proppant delivery containers 1890 and a drive mechanism (e.g., a chain drive) that can advance the proppant delivery containers 1890 across the platform (e.g., from left to right in the illustrated implementation). The left most proppant delivery container 1890 in the illustrated implementation is a full (having been placed onto the platform without having been unloaded yet), the right most proppant delivery container 1890 in the illustrated implementation is empty (having passed the proppant unloading station 1102 and been unloaded), the center proppant delivery container 1890 in the illustrated implementation is being unloaded (into the proppant unloading station 1102 immediately below its bottom discharge port.

The illustrated platform 1893 is supported by a plurality of leveling legs 1895 (or jacks), some of which sit atop pads 1894.

In a typical implementation, the system includes a box advancing mechanism (e.g., a gearbox and motor, electric or hydraulic that can advance the box container to the unloading and emptying positions on the box unloader kit). In a typical implementation, the kit has rollers (that the boxes can roll on, atop the platform) and a chain drive to drive a chain for moving the boxes. In some implementations, the sand box is a size of about 8 feet wide by 9 feet high, by 20 feet long.

Figure 19:
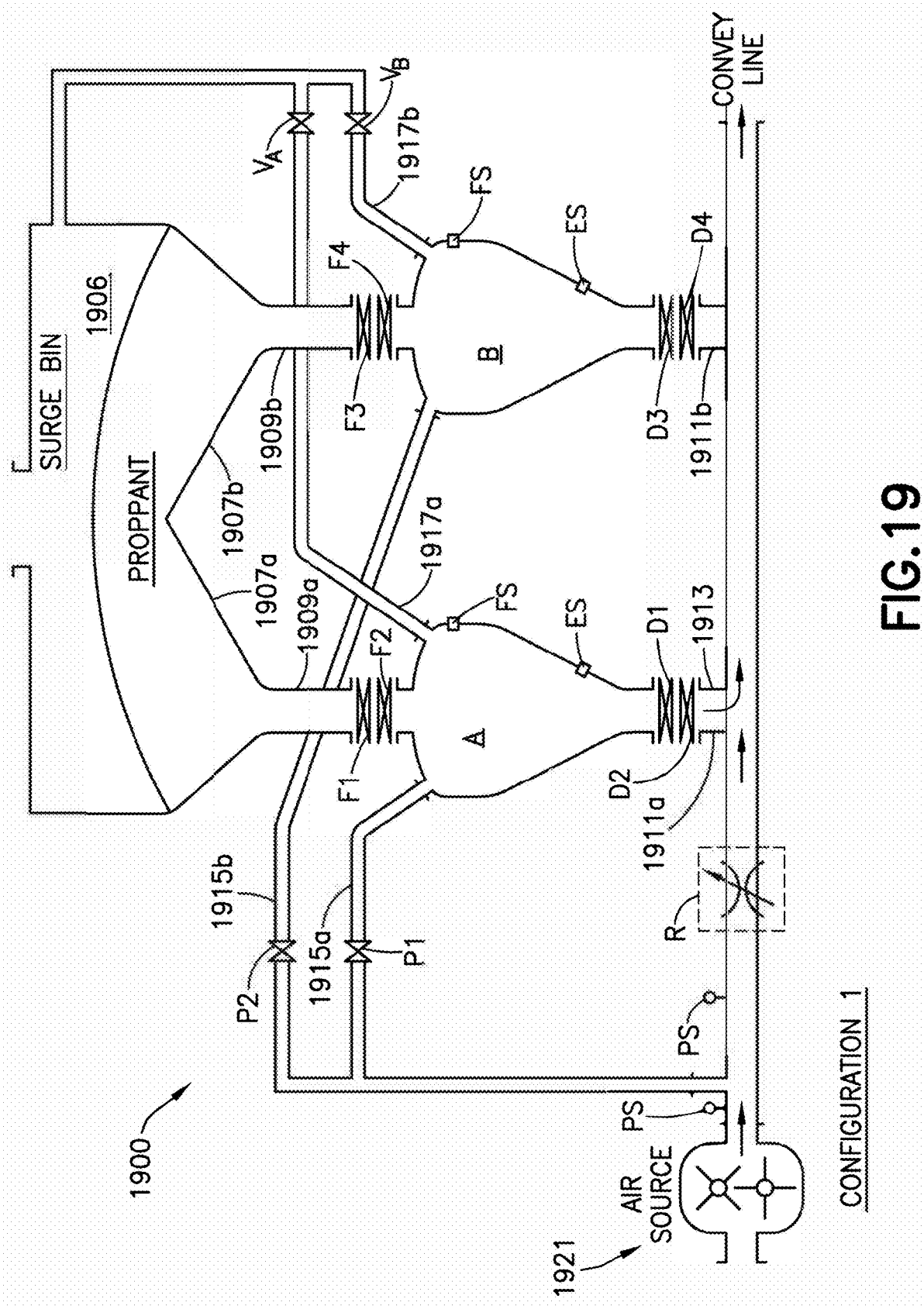
FIG. 19 is a schematic, cross-sectional diagram showing part of one implementation of a material handling system for handling the transfer of granular material from the surge bin to an off-system location (e.g., a silo or the like).

FIG. 19 is a schematic, cross-sectional diagram showing part of one implementation of a material handling system 1900. More specifically, the diagram shows a detailed view of a bottom portion of a surge bin 1906 (with a store of proppant therein), part of a pneumatic conveying system 1908, and a transfer subsystem (with a pair of pods A and B) that facilitates and controls the transfer or passage of proppant from the surge bin 1906 into the pneumatic conveying system 1908.

In a typical implementation, the illustrated configuration provides for a smooth, controlled, and highly efficient transfer or passage of proppant from the surge bin 1906 to the pneumatic conveying system 1908, automatically. Moreover, in a typical implementation, the illustrated configuration can be used to increase or even maximize pneumatic conveying rate while preventing overloading (plugging) in a scenario where the source of the conveyed product is changing (e.g., between pods) and the conveying line (e.g., from surge bin to pneumatic conveying line 1913) varies. This is not typical of an installed system used in a fixed location where conveying line configurations tend to be static and a single product is conveyed repeatedly.

The illustrated surge bin 1906 has a bottom surface that forms a pair of hoppers 1907a, 1907b. Each hopper 1907a, 1907b is connected to, and is able to deliver proppant into, a fill line (1909a or 1909b) for a corresponding one of the pods (A or B).

More specifically, the first hopper 1907a is connected to, and able to deliver proppant into, a first fill line 1909a that extends from the first hopper 1907a to the top of the first pod A. The first fill line 1909a has a first pair of fill valves F1, F2 that are connected in series with one another and configured to control the flow of proppant through the first fill line 1909a and into the first pod A. In a typical implementation, both of the fill valves F1, F2 in the first pair of fill valves are configured to be automatically controlled by a controller, which may be integrated into the operator control panel 1425, for example. These valves F1, F2 may be opened and closed, for example, by an electrical actuator, a hydraulic actuator, or a pneumatic actuator.

In the illustrated implementation, F1 is the upper valve and, in a typical implementation, may be used to start/stop product flow from the surge bin 1906. F2 is the lower fill valve and, in a typical implementation, is used to enact a pressure seal at the top of the first pod A. In such an implementation, F1 and F2 work in cooperation to separate the functions of product flow control and pressure sealing of the first pod A. More specifically, during operation: F2 opens first, without flow or presence of product to enhance seal life. Then F1 opens to allow proppant (sand) to flow. When the first pod A is full, F1 closes first to stop the flow of sand. Then F2 closes after sand stops flowing so that it is not moving through a stream of product to enhance lifespan. Alternately, a single gate or valve could be used if, for example, the reduced life expectancy via higher wear rate is acceptable.

The first pod A has a body with a slightly curved upper surface and side surfaces that extends in a generally downward direction from the slightly curved upper surface to define an inner compartment that is wider up top and narrows down to a hoppered discharge at the bottom. The hoppered discharge at the bottom of the first pod A is connected to, and is able to deliver proppant into, a first discharge line 1911a.

The first discharge line 1911a extends from the bottom of the first pod A and is connected to, and able to deliver proppant from the first pod A, into a pneumatic conveying line 1913 of the pneumatic conveying system 1908. The first discharge line 1911a has a pair of discharge valves D1, D2 that are connected in series with one another and configured to control the flow of proppant out of the first pod A and into the pneumatic conveying line 1913.

In the illustrated implementation, D1 is the upper discharge valve and, in a typical implementation, may be used to start/stop product flow from the first pod A. D2 is the lower discharge valve and, in a typical implementation, is used to enact a pressure seal at the bottom of the first pod A. In such an implementation, D1 and D2 work in cooperation to separate the functions of product flow control and pressure sealing of the first pod A. More specifically, during operation: D2 may open first, without flow or presence of product to enhance seal life. Then D1 opens to allow proppant (sand) to flow. When the first pod A is empty (as indicated by ES), D1 closes first to stop the flow of sand. Then D2 closes after sand stops flowing so that it is not moving through a stream of product to enhance lifespan. Alternately, a single gate or valve could be used if, for example, the reduced life expectancy via higher wear rate is acceptable.

A first air supply line 1915a is connected to the first pod A and configured to deliver compressed air from an air source 1921 into an upper portion of the interior of the first pod A. More specifically, the first air supply line 1915a in the illustrated implementation delivers this compressed air through an opening in the slightly curved upper surface of the first pod A. The position of this opening on the first pod A, through which the first air supply line 1915a delivers the compressed air, can vary in different implementations. In general, however, the opening will be higher than whatever the highest level the proppant is expected to reach during normal system operations by design. In the illustrated implementation, for example, the opening is higher than a proppant "full" level sensor (FS) that is attached to the side wall of pod A near the top of pod A. In a typical implementation, the proppant "full" level sensor (FS) is configured to sense when the pod has been filled with proppant to its designed full level.

The first air supply line 1915a has a first air supply control valve (P1) configured to control the flow of compressed air from the pneumatic conveying system 1908 through the first air supply line 1915a and into the upper portion of the first pod A, above the proppant level in the first pod A.

A first air vent line 1917a is connected to pod A and configured to facilitate the venting of air from the first pod A through an opening in the slightly curved upper surface of first pod A. The position of the vent opening on pod A, where the first air vent line 1917a connects to the first pod A, can vary in different implementations. In general, however, this opening will be higher than whatever the highest level the proppant is expected to reach during normal system operation by design (e.g., higher than the full sensor, FS).

The first air vent line 1917a has a first vent valve (VA) configured to control the flow of vented air from the first pod A through the first air vent line 1917a and into an upper portion of the surge bin 1906. More specifically, the first vent line 1917a facilitates the passage of air from the first pod A into the surge bin 1906 through an opening in the surge bin 1906. The position of the opening in the surge bin 1906, where the first vent line 1917a connects to the surge bin 1906, can vary in different implementations. In general, however, this opening will be higher than whatever the highest level the proppant is expected to reach in the surge bin 1906 during normal system operation by design. This helps ensure that the proppant in the surge bin 1906 will not block the venting of air from the first pod A during system operation.

The first pod A has a pair of proppant level sensors—namely, the full level sensor (FS) near the top of the first pod A and an empty level sensor (ES) near a bottom of the first pod A. These level sensors (FS and ES) can be virtually any kind of level sensors that are able to sense the level of proppant within the first pod A; some examples include vibrating point sensors, rotating paddle sensors, admittance-type sensors, and others.

The full level sensor FS is configured to sense when the pod A is full or close to full (e.g., by volume at least 80% full, 85% full, 90% full, 95% full, or more). More specifically, in a typical implementation, the full level sensor FS is configured to sense when the level of proppant in pod A has reached and, for example, covered the full level sensor FS. The full level sensor FS, in a typical implementation, is further configured to produce an indication (e.g., an electrical signal or the like) to indicate when the level of proppant in pod A has reached the full level sensor FS. The indication may be provided, for example, to an automatic control circuit (e.g., in operator control panel 1425) to enable the system to react to the fact that the level of proppant in pod A has reached a full state and/or to provide some kind of indication (e.g., an audible or visual alarm or indication) to alert the system operator as to the fact that pod A is full.

The empty level sensor ES is configured to sense when pod A is empty or close to empty (e.g., by volume no more than 20% full, 15% full, 10% full, 5% full, or less). More specifically, in a typical implementation, the empty level sensor ES is configured to sense when the level of proppant in pod A has dropped below the location of the empty level sensor 1921*a* and, for example, uncovered the empty level sensor ES. The empty level sensor ES, in a typical implementation, may be further configured to produce an indication (e.g., an electrical signal or the like) to indicate when the level of proppant in pod A has dropped below the empty level sensor ES. This indication may be provided, for example, to an automatic control circuit (e.g., in operator control panel 1425) to enable the system to react to the fact that the level of proppant in pod A has reached a nominally empty state and/or to provide some kind of indication (e.g., an audible or visual alert or indication) to alert the system operator as to the fact that pod A is empty.

The second pod B is connected to the second hopper 1907*b* of the surge bin 1906 via a second fill line 1909*b* that extends from the second hopper 1907*b* to the top of the second pod B. The second fill line 1909*b* has a second pair of fill valves F3, F4 that are connected in series with one another and configured to control the flow of proppant through the second fill line 1909*b* and into the second pod B. In a typical implementation, both of these fill valves F3, F4 are configured to be automatically controlled by a controller, which may be integrated into the operator control panel 1425, for example. These valves F3, F4 may be opened and closed, for example, by an electrical actuator, a hydraulic actuator, or a pneumatic actuator.

Pod B is adjacent to pod A and, in the illustrated implementation, has a substantially identical configuration to pod A. In this regard, like pod A, pod B has a body with a slightly curved upper surface and side surfaces that extends in a generally downward direction from the slightly curved upper surface to define an inner compartment that is wider up top and that narrows down to a hoppered discharge at the bottom. Additionally, the second pod B has a full level sensor (FS) near the top of the second pod B and an empty level sensor (ES) near a bottom of the second pod B; these level sensors (FS and ES) can be virtually any kind of level sensors (e.g., vibrating point sensors, rotating paddle sensors, admittance-type sensors, and others).

The hoppered discharge at the bottom of the second pod B is connected to, and is able to deliver proppant into, a second discharge line 1911*b*. The second discharge line 1911*b* extends from the bottom of the second pod B and is connected to, and able to deliver proppant from the second pod B, into the pneumatic conveying line 1913 of the pneumatic conveying system 1908. The second discharge line 1911*b* has a pair of discharge valves D3, D4 that are connected in series with one another and configured to control the flow of proppant out of the second pod B and into the pneumatic conveying line 1913. In the illustrated implementation, the second discharge line 1911*b* ties into the pneumatic conveying line 1913 of the pneumatic conveying system 1908 downstream (i.e., further from the air source) from where the first discharge line 1911*a* (from the first pod A) ties into the pneumatic conveying line 1913.

A second air supply line 1915*b* is connected to the second pod B and configured to deliver compressed air from the air source 1921 into an upper portion of the interior of the second pod B (e.g., above the highest level of proppant in the second pod B, or above the proppant full level sensor FS, by design). The second air supply line 1915*a* has a second air supply control valve (P2) configured to control the flow of compressed air from the pneumatic conveying system 1908 (e.g., air source 1921) through the second air supply line 1915*b* and into the upper portion of the second pod B.

In the illustrated implementation, the first and second air supply lines 1915*a*, 1915*b* branch off from a common line that extends out of the pneumatic conveying line 1913. This branch off is downstream of the air source 1921, but upstream from the place where the first and second pod discharge lines 1911*a*, 1911*b* tie into the pneumatic conveying line 1913.

A second air vent line 1917*b* is connected to the second pod B and configured to facilitate the venting of air from the second pod B through an opening in the slightly curved upper surface of the second pod B. The position of the vent opening on pod B where the second air vent line 1917*b* connects to the second pod B can be, for example, higher than whatever the highest level the proppant is expected to reach during normal system operation by design (e.g., higher than the full sensor, FS in the second pod B).

The second air vent line 1917*b* has a second vent valve (VB) configured to control the flow of vented air from the second pod B through the second air vent line 1917*b* and into an upper portion of the surge bin 1906. The second air vent line 1917*b* in the illustrated implementation ties into the first air vent line 1917*a* downstream of the vent valves (VA, VB).

There is a constricted section (R) in the pneumatic conveying line 1913 downstream of the branch off for the first and second air supply lines 1915*a*, 1915*b* and upstream of the tie in from the first and second pod discharge lines 1911*a*, 1911*b*. This constricted section may be an orifice plate, or any other type fixed or variable physical component (e.g., an automatic valve or the like) that forms or can create a short, constricted section (R) in the air path of the pneumatic conveying line 1913. The constricted section (R) results in a pressure drop across the constricted section (R) when air is flowing through the pneumatic conveying line 1913. Thus, the pressure of the air upstream of the constriction (R) and that gets delivered into the upper portion of the pods via 1915*a* and 1915*b* is higher than the pressure that is downstream of the constriction (R) and that the proppant gets dropped/urged into from the pods (A and B). This pressure difference produced by the constriction (R) helps ensure that the air pressure delivered into the top of the pods (A and B) is high enough to help urge proppant inside of the pods down into the lower pressure air stream inside the pneumatic conveying line 1913.

There is a pressure gage (PS) at the outlet of the air source 1921 upstream of the branch off for the first and second air supply lines 1915*a*, 1915*b* and another pressure gage (PS) between the branch off of first and second air supply lines 1915*a*, 1915*b* and the constricted section (R) of the pneumatic conveying line 1913. In various implementations, other pressure gages may be provided as well.

In a typical implementation, a control system (not shown in FIG. 19, but which may be integrated into the operator control panel 1425, for example) is provided to automatically control the opening and closing of various flow control components (e.g., valves, etc.) in the illustrated system 1900. In a typical implementation, the valves are controlled in a manner such as described herein that results in optimizing or maximizing the rate of sand transfer out from the system 1900 through the pods and to the pneumatic conveying line 1913. The pneumatic conveying line 1913, in a typical implementation, delivers the proppant to a system outlet, which may be connected to a deliver hose or pipe or other kind of separate communication channel to an off-system component such as a silo or the like. In a typical implementation, opening and/or closing of the valves may be performed by virtue of actuators, which may be, for example, electrical actuators, hydraulic actuators, pneumatic actuators, etc.

The controllable components (e.g., valves) in the illustrated system 1900 may be controlled in a variety of ways to deliver proppant (sand) from the surge bin 1906 to the pneumatic conveying line 1913. One example of such control scheme is described below.

In this example, when filling one of the pods (A or B), fill valves F1, F2 or F3, F4 for the pod being filled are open to allow product (e.g., proppant) to flow by gravity into the pod. The vent valve Va or Vb for the pod being filled is open to allow displaced air to flow into the surge bin 1906. This increases the rate at which product can flow into the pod as the displaced air does not have to move up through the falling product. A short fill process can be important to allow subsequent time for pressurization of the POD prior to discharging. During filling, the discharge valves D1, D2 or D3, D4 for the pod being filled are closed. Additionally, during filling, the air supply valve P1, P2 for the pod being filled is closed.

When pressurizing a pod (A or B), the fill valves F1, F2 of F3, F4 for the pod being pressurized are closed and the discharge valves D1, D2 or D3, D4 for the pod being pressurized are closed. The vent valve Va or Vb for the pod being pressurized is closed. The air supply valve P1 or P2 for the pod being pressurized is open to equalize pressure in pod being pressurized with the output of the air source 1921 (maximum system pressure). In a typical implementation, pressurization of the pod is required prior to starting to discharge the product from the pod. The air in the conveying line is at high pressure so without the pod pressurization process, when the discharge valves D1, D2 or D3, D4 are opened product would not be able to begin to flow until the pressure in the POD had equalized with the pneumatic conveying line 1913. In order to maximize conveying rate the transition of product flow from one pod to the other pod has to be very fast and non-disruptive to the flow of conveying air or product.

When discharging one of the pods (A or B), the fill valves F1, F2 or F3, F4 for the pod being discharged are closed, the vent valve Va or Vb for the pod being discharged is closed, the air supple valve P1 or P2 for the pod being discharged is open, and the discharge valves D1, D2 or D3, D4 for the pod being discharged are open. In some implementations, discharge valves D2 and D4 may be discharge modulating valves that are proportionally controlled by the control system. Moreover, the upper discharge valves (D1 or D3) may be used to start/stop flow of product from the pod to preserve seals on the modulating valves D2, D4. During discharge function, the modulating valve D2, D4 for the pod being discharged is controlled by the control system to achieve the desired system conveying pressure. If a modulating valve is throttled to open more, this allows more product to flow from the pod being discharged into the conveying line 1913, which increases the overall system restriction/friction/resistance and increases backpressure, which may be measured by the pressure sensor Ps that just upstream of the restricted portion (R) of the conveying line 1913 (or other pressure sensor). In turn, if the modulating valve is throttled closed more, this reduces the flow of product from the pod being discharged into the conveying line 1913 and reduces system backpressure. In general, the modulating discharge valve may be controlled by the control system so as to throttle in proportion to the system backpressure.

There are several advantages of using a dual valve arrangement, as shown in the figures and described herein, instead of a single valve that both starts/stops and modulates flow. Some of these advantages include, for example, faster starting and stopping, the valve at D2, D4 is chosen to achieve high speed operation, not fine adjustment. Valves which have proportional modulating control tend to be slow to achieve metering accuracy. The valves used at position D1, D3 are equipped such that they have slow and accurate (fine) adjustment which is preferable to achieve accurate product flow and metering.

When a pod has been emptied, as indicated by the empty level sensor ES for that pod, and prior to re-filling, that pod is generally vented back to atmospheric/neutral pressure. When this is occurring, generally, all valves are closed except the vent valve which is opened to vent the pod into the surge bin 1913. Once the pressure in the vented pod is reduced then the pod is ready to refill. In some implementations, a pressure sensor may be provided (e.g., inside each pod) to sense pressure inside the pod for this purpose.

In general, a conveying system can be controlled with various quantities of pods within a train. In configuration shown, two pods are provided in one train to achieve relatively continuous product dispensing and conveying. However, in other configurations, more than two pods may be provided in one train (e.g., tied to one a surge bin and a pneumatic conveying line). In general, it is desirable that the time required to empty/discharge each POD be greater than the time used to vent, fill and pressurize the other POD or else there will be time intervals where neither POD is discharging, which is undesirable when trying to optimize product flow. In the configuration shown, fill valves F1, F2 and F3, F4 are larger (i.e., they have larger inner diameters) than the discharge valves D1, D2 and D3, D4 to ensure rapid filling.

In general, to achieve high continuous conveying rates of product, the system 1900 should establish an optimal rate of product discharge from a pod and then maintain that rate by minimizing disruptions. The flow characteristics of product in a pneumatic conveying line (e.g., 1913) are usually not completely even/smooth/stable so, in a typical implementation, the control system continuously monitors system pressure and adjusts the POD discharge modulating valves, accordingly.

There are a variety of strategies that the system 1900 may implement to manage transitions between pods. Continuous flow is not possible from using only a single pod. If two (or more) pods are used in a train, then one of the principal functions of the control system is to manage the transitions between the two pods. The modes of managing the transition are generally limited by/to the valves present in the configuration: venting, pressurizing, filling and discharging. Switching flow between pods becomes a function of switching off flow of one pod, and establishing stable product flow from the other pod as quickly as possible.

The gravity flow of product out of a pod into the pneumatic conveying line is not linear throughout the entirety of the process. As a pod gets close to being empty, the rate becomes less stable and generally reduces towards the end which is typical of granular or powder flow out of a fixed hopper. To ensure maximum conveying rate is maintained, the control system may switch pods before completely emptying a pod to avoid tapering off of the discharge rate. The low-level sensor (Empty Sensor, ES) is positioned to generate a "near empty" warning so that the control system can initiate switching to the other POD prior to running the proppant level so low that the conveying rate is reduced too much. The control system, in some implementations, also uses timer/timing function (e.g., with a built-in timing circuit) for backup to initiate pod switching even if the empty sensor is not triggered (or the empty sensor signal is not received). This helps prevent against the system "hanging" due to a faulty sensor or a missed sensor trigger.

In a typical implementation, the control system operates the valves to fill each pod completely (as indicated by the full level sensor (Full Sensor, FS) for that pod, to extend the time between pod transitions. In a typical implementation, the full level sensor (FS) is positioned in each pod to maximize product level in the pod but leave enough time between full sensing to allow the fill valves to close freely and stop the flow of product before it builds up high enough to contact or interfere with the operation of the fill valves, thus helping to preserve the seals on those valves for longevity. Moreover, in some implementations, the control system utilizes a timer function (e.g., with a built-in timer circuit) to set and track a maximum "fill time" for each fill and closes the fill valve(s) upon expiration of the maximum "fill time" in the absence of a signal from the full level sensor (FS). This prevents the system from "hanging" or pausing due to faulty sensor or a missed sensor trigger. Likewise, in some implementations, the control system utilizes a timer function (e.g., with a built-in timer circuit) to set and track a maximum "empty time" for each emptying of a pod and closes the discharge valve(s) upon expiration of the maximum "empty time" in the absence of a signal from the empty level sensor (ES).

In the illustrated implementation, the system is configured to raise the pressure inside a pod above the pressure in the pneumatic conveying line 1913 where the pod discharges. This is achieved by introducing a moderate restriction (R) into the pneumatic conveying line 1913 upstream from where the pods tie into the pneumatic conveying line 1913. Typically, the restriction is slight enough to not create a large power loss in the air flowing through the pneumatic conveying line 1913 but significant enough to generate a beneficial pressure differential between the air delivered into the pods and the air in the pneumatic conveying line 1913 downstream of the restriction (R) to ensure more positive discharge flow from the pod. The restriction (R) may not be necessary in all implementations.

In some instances, the pod pressurization function can be disruptive to conveying if it causes a sudden, non-trivial drop of pressure and resultant loss of conveying velocity, which is undesirable. There are several different ways that this risk can be managed and reduced.

One way of controlling pod pressurizing air flow to minimize disruption of the conveying air is represented in the system 1900 of FIG. 19. The illustrated implementation includes air supply valves P1 and P2 with no other restrictions in the pod pressurizing lines. If the air supply valves P1, P2 are opened slowly, or with a controlled position profile (e.g., a program where the valves open slightly, holds position for a while and then continues to open to the fully open position), then the pod pressurization will occur slowly, minimizing the disturbance or loss of conveying air pressure. In some implementations, the control system is configured to control the air supply valves P1, P2 in this manner. Alternatively, valves P1, P2 may be downsized to introduce a restriction, acting as an orifice to slow down the pressurizing process. However, in some instances, this may not provide sufficient air flow to facilitate maintaining pressure as the pod discharges.

Other ways of controlling pod pressurizing air flow to minimize disruption of the conveying air are represented in FIGS. 20-24, discussed below.

Figure 20:
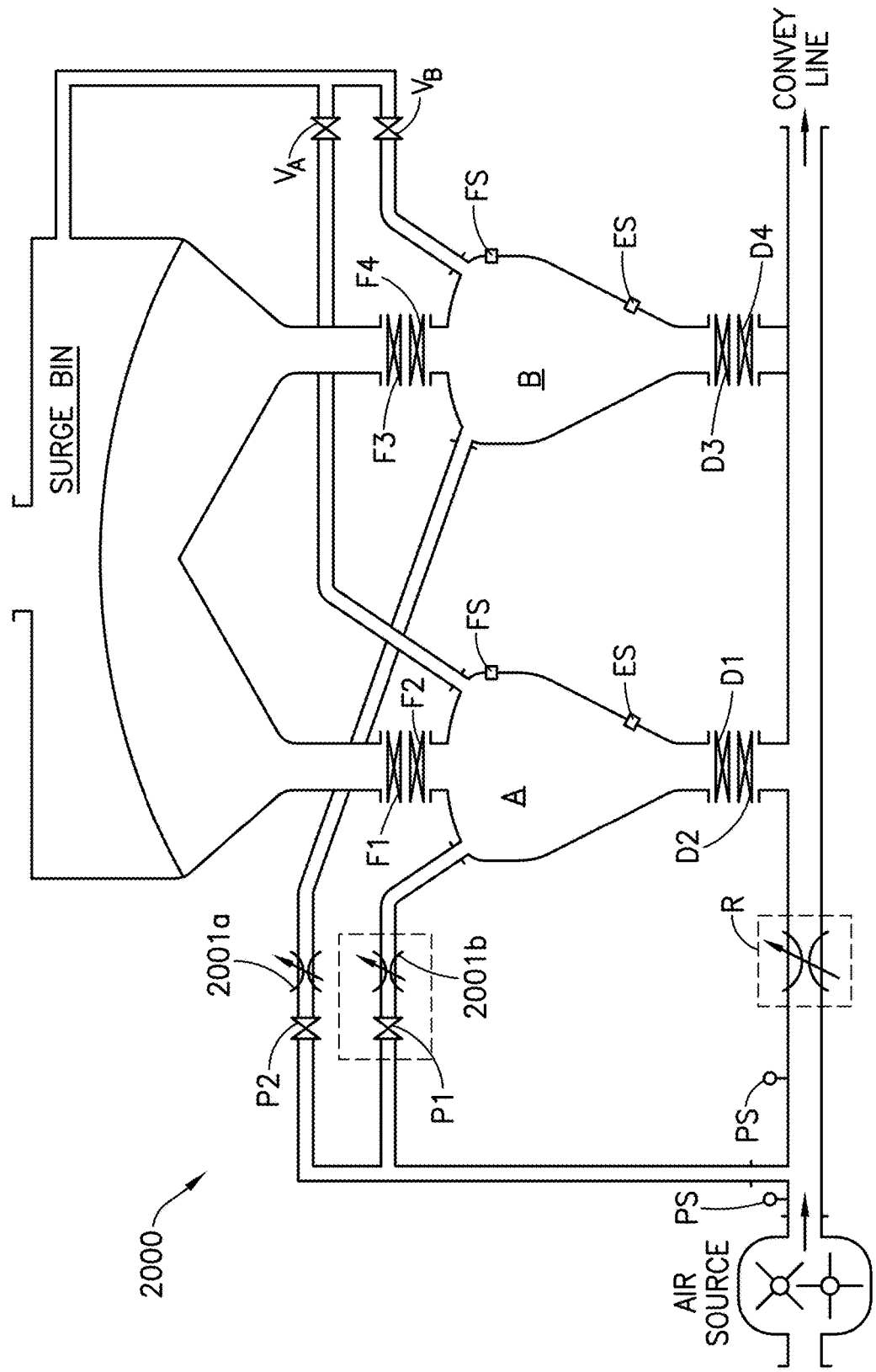
FIG. 20 is a schematic, cross-sectional diagram showing part of another implementation of a material handling system for handling the transfer of granular material from the surge bin to an off-system location.

FIG. 20 is a schematic, cross-sectional diagram showing part of an alternative implementation of a material handling system 2000. The illustrated material handling system 2000 is similar to the material handling system 1900 represented in FIG. 19, except that in the material handling system 2000 in FIG. 20, the air supply valves P1 and P2 for the pods are augmented with adjustable flow control elements 2001*a*, 2001*b* (e.g., valves) that can be adjusted to facilitate variable flow rates. In some alternative implementations, the adjustable flow control functionality may be incorporated into and provided by the air supply valves themselves.

If a material handling system (e.g., 2000) includes adjustable flow control elements (e.g., 2001*a*, 2001*b*), the control system may be configured to control each adjustable flow control element 2001*a*, 2001*b* in a manner that ensures that each pod is provided with an adequate amount of pressure, which may be measured and provided into the control system by a pressure gage inside each pod, to facilitate proppant flow out of the pod without markedly disrupting the conveying pressure/flow ins the conveying air line 1913. The conveying pressure may be measured and provided to the control system by the pressure sensor PS just downstream of the air supply line branch off.

Figure 21:
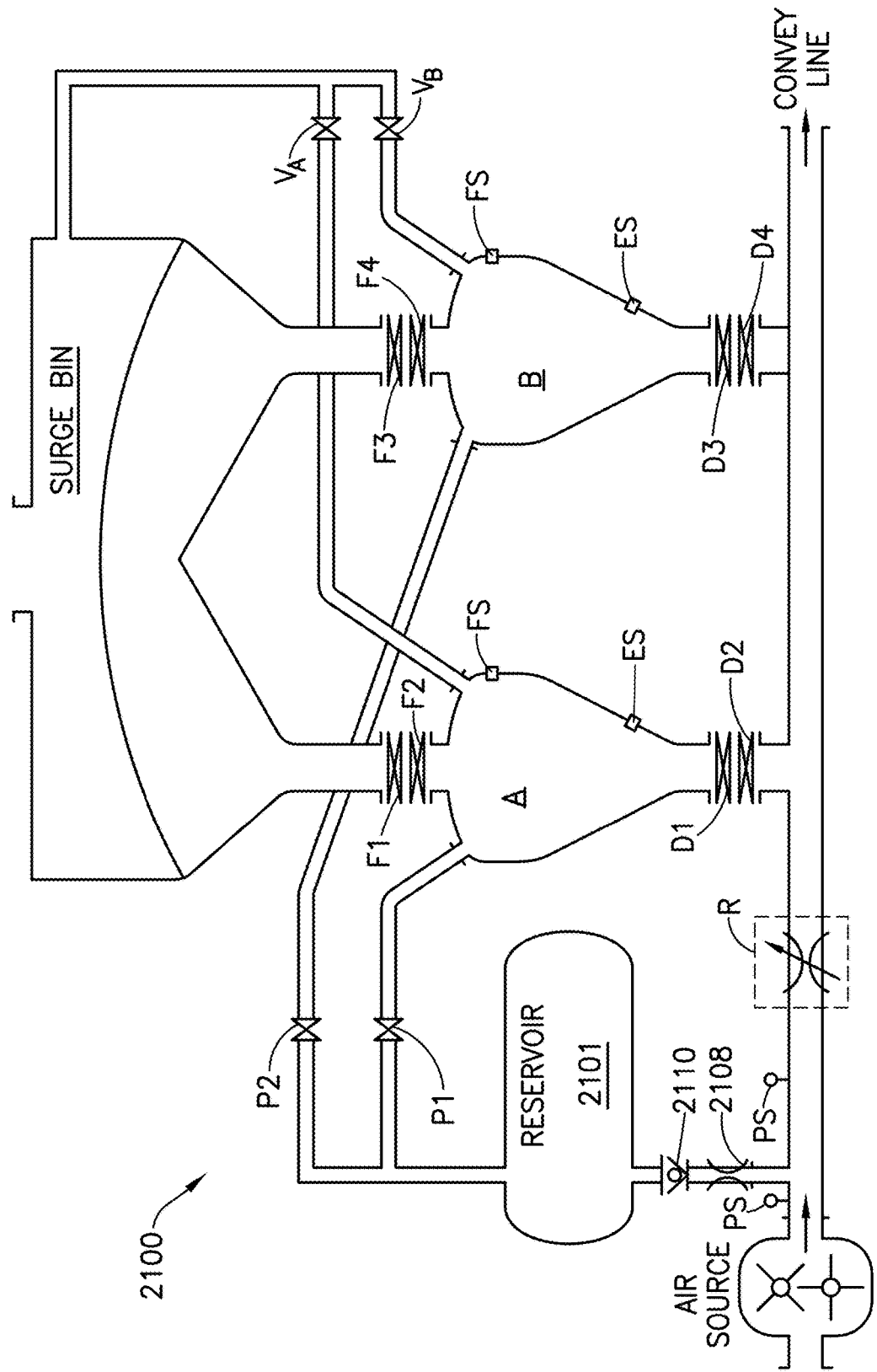
FIG. 21 is a schematic, cross-sectional diagram showing part of yet another implementation of a material handling system for handling the transfer of granular material from the surge bin to an off-system location.

FIG. 21 is a schematic, cross-sectional diagram showing part of an alternative implementation of a material handling system 2100. The illustrated material handling system 2100 is similar to the material handling system 1900 represented in FIG. 19, except that the material handling system 2100 in FIG. 21 also has an intermediate air tank 2101 for the air supply lines which acts as an accumulator (or reservoir) for pressurized air, an orifice/flow control element 2108, and a check valve 2110 to prevent air from moving from the reservoir back into the pneumatic conveying line 1913. The reservoir can draw small amounts of air continually from the conveying air to provide the POD pressurization supply. Then, when needed to pressurize a pod, the reservoir can provide a large amount of air without notably disrupting the pressure and/or flow in the pneumatic conveying line 1913 downstream of the air supply branch off.

Figure 22:
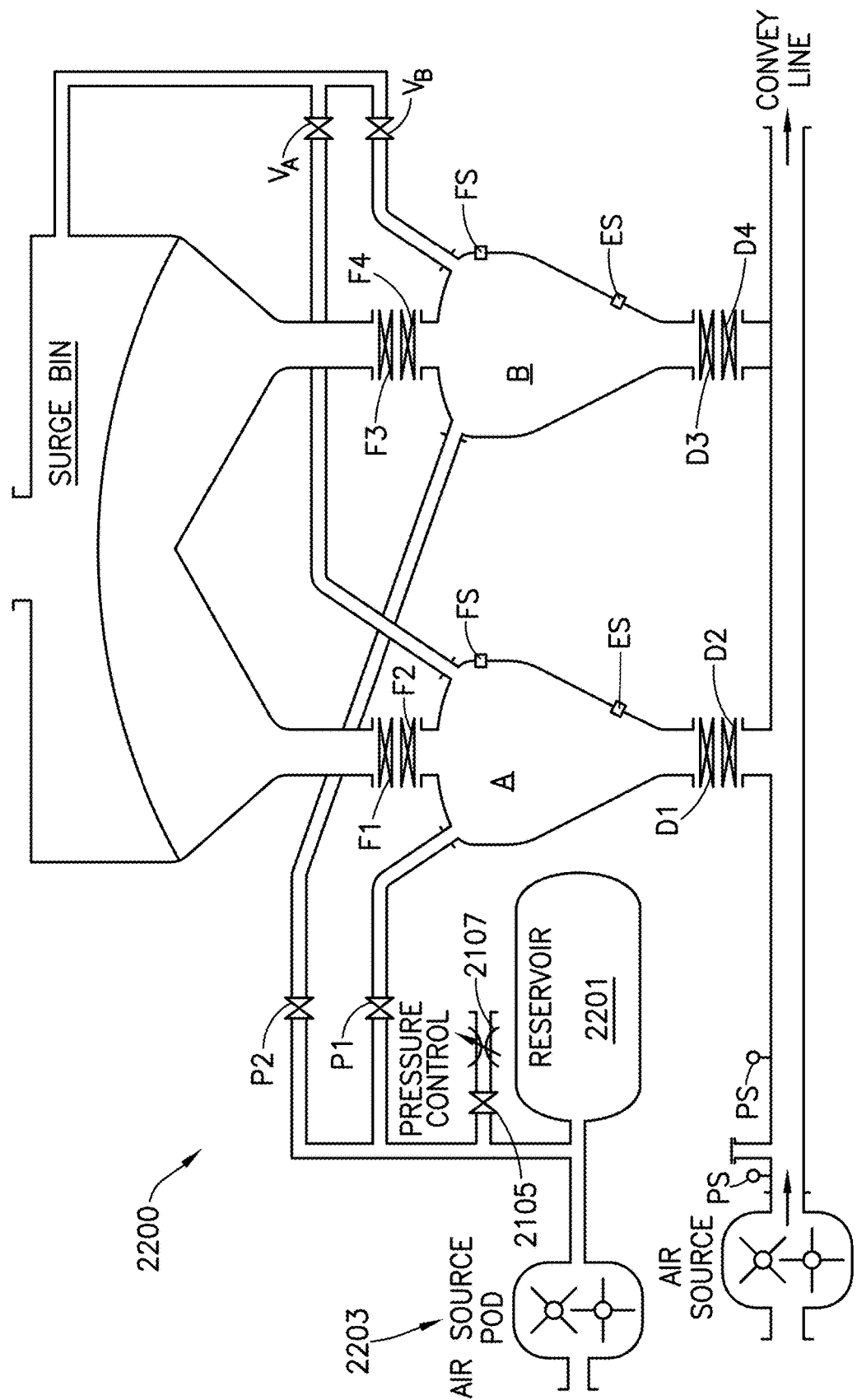
FIG. 22 is a schematic, cross-sectional diagram showing part of still another implementation of a material handling system for handling the transfer of granular material from the surge bin to an off-system location.

FIG. 22 is a schematic, cross-sectional diagram showing part of an alternative implementation of a material handling system 2200. The illustrated material handling system 2200 is similar to the material handling system 1900 represented in FIG. 19, except the material handling system 2200 has an extra pod-specific air source 2203 (e.g., an air compressor or the like) that is separate from system's main air source 1921 (which supplies air to the pneumatic conveying line 1913), an intermediate air tank 2201 connected to the outlet of the pod-specific air source 2203 which acts as an accumulator (or reservoir) for pressurized air from the pod-specific air source, and a pressure control valve 2105 and flow controller 2107, and lacks a restriction (R) (shown in FIG. 19) in the pneumatic conveying line 1913. In a typical implementation of the system represented in FIG. 22, only one pressure sensor (instead of the two shown) might be required—more is redundant.

In a typical implementation, the additional air source 2203 has an additional advantage in that it can operate at a higher pressure than the conveying line 1913 which will further enable flow of product from the pods into the conveying line 1913. Pressure in the air supply lines may be set by the valve 2105 and flow control element 2107 (e.g., a valve) to achieve a desired pressure set point in the air supply lines. In some implementations, the line that includes the valve 2105 and flow control element 2107 discharges to atmosphere. This configuration has a very favorable overall performance potential as none of the primary air is diverted from conveying to the secondary function of POD pressurization and top-up. Note in this configuration the convey line restriction (R) in FIG. 19 would have no utility in this regard.

Figure 23:
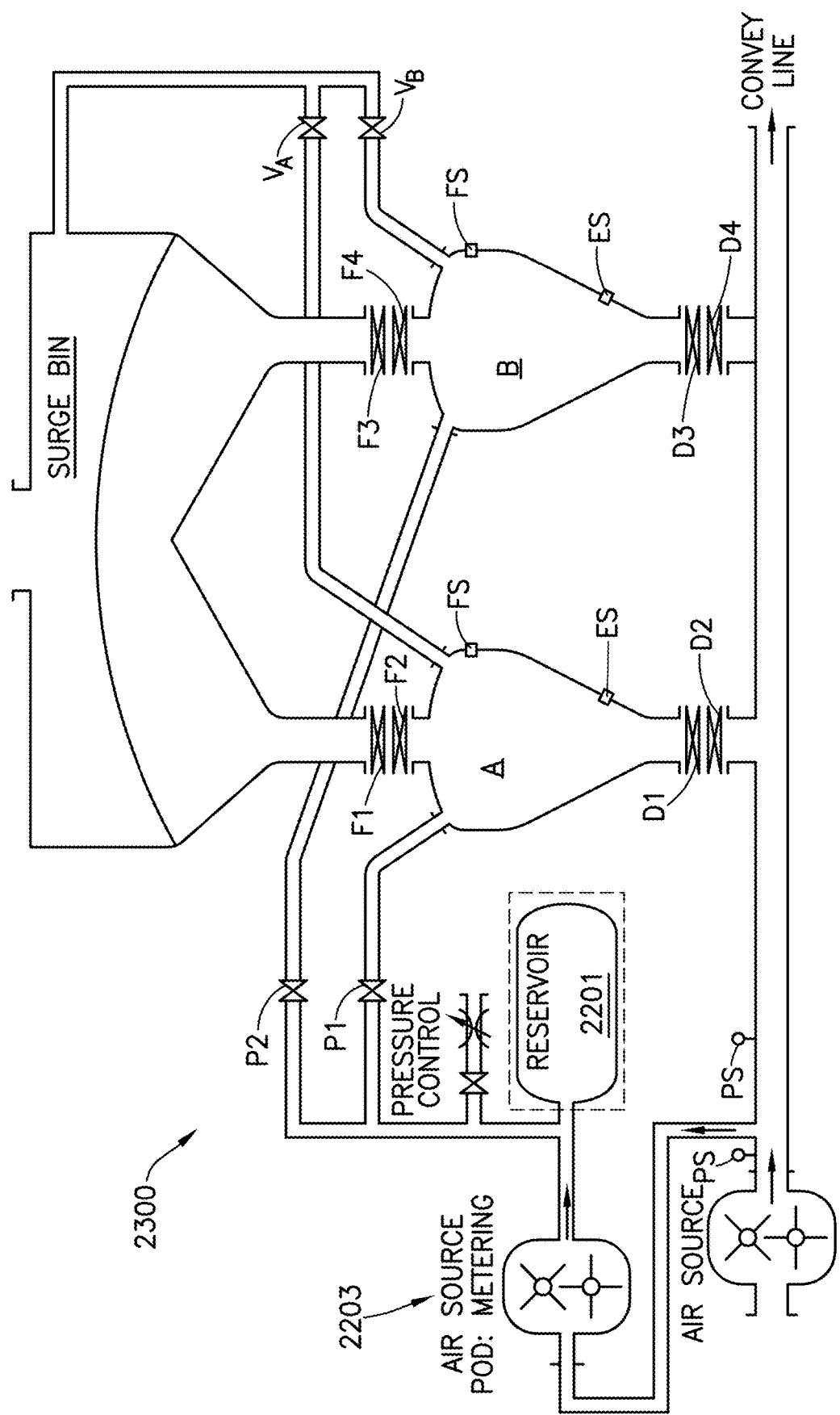
FIG. 23 is a schematic, cross-sectional diagram showing part of even another implementation of a material handling system for handling the transfer of granular material from the surge bin to an off-system location.
Figure 24:
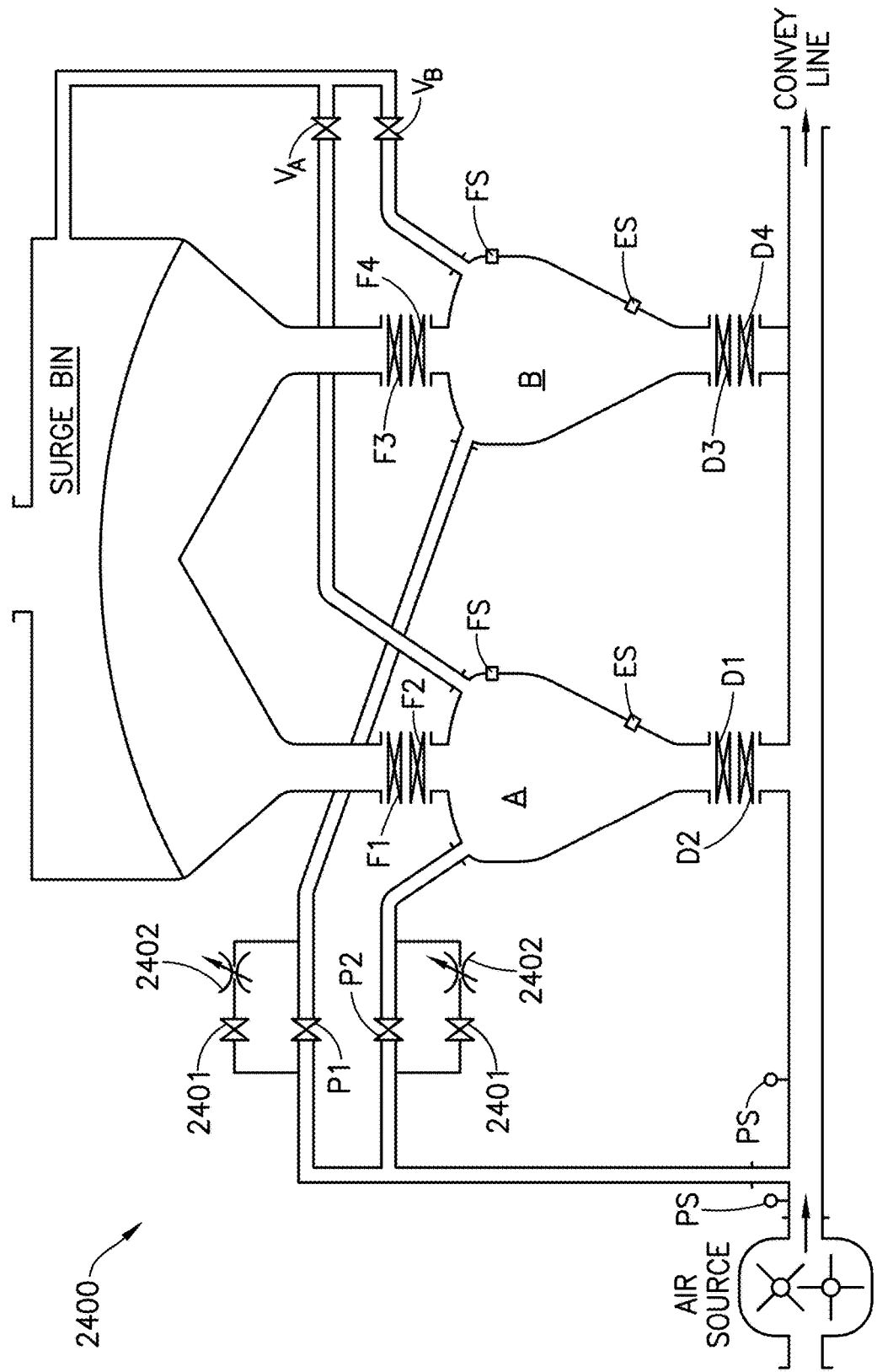
FIG. 24 is a schematic, cross-sectional diagram showing part of yet another implementation of a material handling system for handling the transfer of granular material from the surge bin to an off-system location.

FIG. 23 is a schematic, cross-sectional diagram showing part of an alternative implementation of a material handling system 2300. The illustrated material handling system 2300 is similar to the material handling system 2200 represented in FIG. 22, except the material handling system 2300 diverts pre-pressurized air downstream of the main conveying air source 1921 and meters a small fraction of it into the POD pressurization system. More specifically, the system 2300 includes a pod pressurizing line that branches off from the pneumatic conveying line 1913 to provide pre-pressurized air to the input of the separate pod air source 2203. In a typical implementation, the size of the branch line will be sized with a small enough inner diameter such that any air diverted from the pneumatic conveying line 1913 for pod pressurization is not sufficient to notably disrupt the conveying air pressure/flow. The pressure control can be used to limit or reduce the pressure in the reservoir (2201) and the discharging POD as needed to maintain the desired pressure. This pressure would be incrementally higher than the convey line pressure, but in case the convey line pressure went down, then the pressure control allows the control system to vent excess air pressure to avoid a too-high pressure differential between the POD and convey line FIG. 24 is a schematic, cross-sectional diagram showing part of an alternative implementation of a material handling system 2400. The illustrated material handling system 2400 is similar to the material handling system 1900 represented in FIG. 19, except that the system 2400 includes an extra air-line that is connected in parallel with each air supply valve P1, P2. That extra air-line has a valve 2401 and a metering device or orifice 2402. In a typical implementation, the control system controls this valve configuration for pressurizing a pod to provide initial air flow through the valve 2401 and metering device or orifice 2402 for that pod to moderate airflow when pressurizing the pod, then a larger valve (P1 or P2) is opened to provide the conveying make-up airflow into the pod. The metering device can be any kind of physical component for metering or controlling flow through the air-line (e.g. a control valve, etc.).

Figure 25:
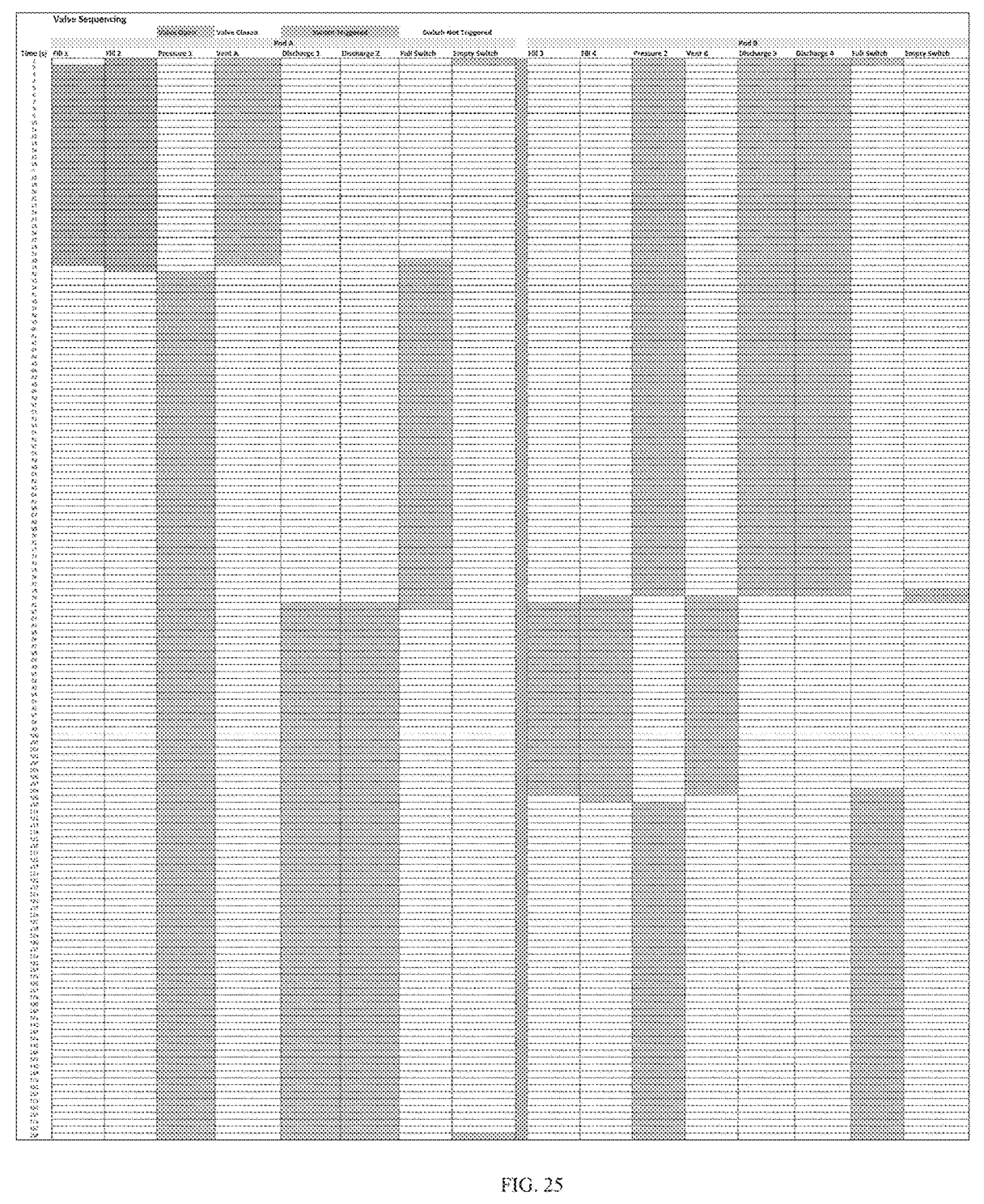

FIG. 25 is a schematic representation of a timing diagram that represents one example of valve sequencing that the system controller might implement in the system 1900 of FIG. 19. In a typical implementation, this example of valve sequencing would provide for continuous, efficient flow of proppant out from the pneumatic conveying line 1913.

The timing diagram represents timing of the valves and sensor signals associated with pod A on the left and timing of the valves and sensor signals associated with pod B on the right.

The valves associated with pod A that are represented in the illustrated timing diagram include the fill valves—Fill 1 (F1), Fill 2 (F2), the pressure valve—Pressure 1 (P1), the vent valve—Vent A (Va), and the discharge valves—Discharge 1 (D1), Discharge 2 (D2). The sensor signals associated with pod A that are represented in the illustrated timing diagram include the full level sensor (Full Switch, FS) and the empty level sensor (Empty Switch, ES).

Likewise, the valves associated with pod B that are represented in the illustrated timing diagram include the fill valves—Fill 3 (F3), Fill 4 (F4), the pressure valve—Pressure 2 (P2), the vent valve—Vent B (Vb), and the discharge valves—Discharge 3 (D3), Discharge 4 (D4). The sensor signals associated with pod A that are represented in the illustrated timing diagram include the full level sensor (Full Switch, FS) and the empty level sensor (Empty Switch, ES).

At the top (start) of the illustrated timing diagram, pod A is empty or close to empty and about to start being filled with proppant (from the surge bin). The empty status of pod A is indicated by a signal provided (at time=1 second) from the empty level sensor (Empty Switch). In response to receiving that signal, the system controller signals for the pod A vent and fill valves to open. In response to this signaling, the vent (vent A) for pod A opens and the fill valves (F1, F2) open for pod A. First, fill valve (Fill 2, F2) opens, then fill valve (Fill 1, F1) opens.

Proppant then flows, under the influence of gravity, from the surge bin 1906, through the open fill valves F1, F2 into pod A. In the illustrated example, proppant flows from the surge bin 1906 to pod A from second 2 to second 30. As pod A fills up, any displaced air is able to exit pod A through the open vent line (via open vent valve Va). The flow of proppant from the surge bin 1906 to pod A continues, in the illustrated example, until the full level sensor (Full Switch, FS) senses, and signals to the control system, that pod A is full or almost full.

At second 30, in the illustrated example, the full level sensor (Full Switch, FS) senses, and signals to the control system, that pod A is full or almost full. In response to receiving that signal, the system controller signals for the pod A vent and fill valves to close. In response to this signaling, the vent (vent A) for pod A closes and the fill valves (F1, F2) for pod A close. First, fill valve (Fill 1, F1) closes, then fill valve (Fill 2, F2) closes. Additionally, the system controller signals for pod A to begin pressurizing. In response to this signal, pressure 1 valve opens to start pressurizing POD A in preparation for discharging once POD B is empty.

Referring now to the pod B side of the timing diagram, it can be seen that, at time mark 0 seconds, the pressure valve (pressure 2) for pod B already has been opened and at least some pressurized air has been introduced into pod B. Moreover, at time mark 0 seconds, the full level sensor (Full Switch, FS) for pod B has sensed and signaled that pod B is full. In response to that signal, the system controller has signaled for the discharge valves (discharge 3 and discharge 4) for pod B to open. Once the discharge valves (discharge 3 and discharge 4) for pod B open, proppant flows out of pod B through the open discharge valves (discharge 3 and discharge 4) while pressurized air continues to be delivered into the upper portion of pod B (above the proppant level) through the open pressure valve (pressure 2). This pressurized air helps to urge the proppant to flow into the pneumatic conveying line below pod B. As shown in the illustrated time line, the pressure valve (pressure 2), and the discharge valves (discharge 3, discharge 4) for pod B remain open until pod B finishes discharging (as indicated by a signal from the Empty Switch).

At time mark 78 seconds, in the illustrated example, the Empty Switch (ES) signals that pod B is empty or almost empty. In response to this signaling, the system controller causes the pressure valve (pressure 2) and the discharge valves (discharge 3, discharge 4) on pod B to close. Also, in response to this signaling, the system controller signals for the pod B vent and fill valves to open. In response to this signaling, the vent (vent B) for pod B opens and the fill valves (F3, F4) open for pod B. First, fill valve (Fill 4, F4) opens, then fill valve (Fill 3, F3) opens.

Proppant then flows, under the influence of gravity, from the surge bin 1906, through the open fill valves F3, F4 into pod B. In the illustrated example, proppant flows from the surge bin 1906 to pod B from second 78 to second 108. As pod B fills up, any displaced air is able to exit pod B through the open vent line (via open vent valve Vb). The flow of proppant from the surge bin 1906 to pod B continues, in the illustrated example, until the full level sensor (Full Switch, FS) for pod B senses, and signals to the control system, that pod B is full or almost full.

Meanwhile, on the pod A side of the timing diagram, pressurized air is introduced into pod A through pressure valve (pressure 1) from time mark 31 seconds to the end of the timing diagram at time mark 158 seconds. The Full Switch for pod A remains in a triggered state until the discharge valves (discharge 1, discharge 2) for pod A open and the proppant level drops below the full or almost full level in pod A.

When the empty switch on pod B signals that pod B is empty or almost empty (and, therefore, finished or about to finish discharging), the system controller signals for pod A to start discharging. In response to this signaling, the discharge valves (discharge 1, discharge 2) on pod A open and pod A begins to discharge just as (or immediately) after pod B finishes discharging. Pod A discharges through the open discharge valves (discharge 1 discharge 2) from time mark 81 seconds to time mark 158 seconds. The pressure valve (pressure 1) for pod A remains open, introducing pressurized air into pod A, the entire time pod A is being discharged.

At time mark 158 seconds, the Empty Switch on pod A senses and signals that pod A is empty or almost empty and pod A cycles back to the top of the timing diagram.

In response to the full level sensor (Full Switch, FS) for pod B signaling that pod B is full or almost full (at time mark 108 seconds), the system controller signals for the pod B fill valves (Fill 3, Fill 4) and pod B vent valve (Vent B) to close, and signals for the pressure valve (pressure 2) for pod B to open. The pod B fill valves (Fill 3, Fill 4) and pod B vent valve (Vent B) closes, and the pressure valve (pressure 2) for pod B opens. Thereafter, pressurized air is urged into an upper portion of pod B through the open pressure valve (pressure 2) for pod B. The full level switch (Full Switch) for pod B remains triggered until pod B circles back to the top of the timing diagram, begins to discharge, and the level of proppant starts to drop.

When the Empty Switch on pod A senses and signals that pod A is empty or almost empty and pod A cycles back to the top of the timing diagram, the system controller signals for the pod A discharges (discharge 1, discharge 2) to close, the pod A pressure valve (pressure 1) to close, the pod A vent (Vent A) to open, and the pod A fill valves (first, Fill 2, then Fill 1) to open. Moreover, when the Empty Switch on pod A senses and signals that pod A is empty or almost empty, the system controller signals for the pod B discharge valves (discharge 3, discharge 4) to open. In response to the foregoing signaling, when the system cycles back to the top of the timeline, the pod A discharges (discharge 1, discharge 2) close, the pod A pressure valve (pressure 1) closes, the pod A vent (Vent A) opens, the pod A fill valves (first, Fill 2, then Fill 1) open, and the pod B discharge valves (discharge 3, discharge 4) open.

Thus, it can be seen, in the exemplary time line that the system controller toggles between pods—discharging from one, then discharging from the other. In the illustrated implementation, there is no (or very little) delay between each discharge.

The timing diagram and details provided therein are of course illustrative only and should not be interpreted as limiting to the scope of this disclosure. A number of embodiments of the invention have been described. Nevertheless, it will be understood that various modifications may be made without departing from the spirit and scope of the invention.

For example, the number of system component can vary considerably from system to system. For example, in various implementations, a system might have any number (one or more) proppant unloading stations, mechanical conveyor systems, dust collectors, proppant holding containers, air locks, and/or air blowers. Moreover, the arrangement of system components on a particular chassis can vary as well. As an example, in some implementations, the proppant holding container may be positioned near the front of the chassis, with the proppant unloading station near the rear of the chassis.

The chassis can be virtually any kind of supporting frame for the other components of the material handling system described herein. It can be made of a variety of different materials or combinations of materials and have a variety of different physical configurations. Prime movers can be virtually any kind of internal combustion engines, electric motors, pneumatic motors, hydraulic motors, etc.

The air blower assemblies 1126 can have any one of a variety of different physical configurations.

Other support equipment may be included. If, for example, the ramps and/or other equipment (e.g., jacks, etc.) are hydraulically-driven, then the system would include one or more hydraulic pumps and a system for delivering pressurized hydraulic fluid from those hydraulic pump(s) to the ramps and/or other equipment.

In some implementations, the air locks may include dense phase/dilute phase pneumatic conveying technologies, including, for example, such technologies available from the Schenck Process Company. Moreover, in some implementations, the air lock may include dense phase pressure vessels, such as the dense phase pressure vessels, available from the Coperion GmbH.

The mechanical conveyor system can include any one or more of a variety of different mechanical elements and components to mechanically convey material (e.g., the proppant) from the proppant unloading station into the proppant holding container. For example, in some implementations, the mechanical conveyor system may include any number of (one or more) conveyors. Alternatively, or additionally, the mechanical conveyor system could include one or more different types of mechanical conveyor technologies including, for example, screw conveyors, drag chain conveyors, belt conveyors, vibrating conveyors, vertical conveyors, spiral conveyors etc. and/or any combination thereof. Mechanical conveyor systems that use belts can have virtually any size belts. If the system includes only one single conveyor belt, that single belt might have a horizontal portion that extends from the unloading station to a bend and then an angled portion that extends from the bend to the top of the mechanical conveyor system.

The transfer rate or conveying rate for a particular mechanical conveyor system may vary. For example, in a system that includes a single mechanical conveyor system the transfer rate or conveying rate for that single mechanical conveyor system may be between 5 and 15 tons per minute (e.g., 10 tons per minute). Additional mechanical conveyor systems will increase the overall transfer rate or conveying rate by the transfer rate of the additional mechanical conveyor system(s). In one exemplary implementation, each air blower 1126 has a capacity of about 1000 standard cubic-feet per minute. The capacity of the air blower, and all other components of the system, can vary considerably.

The dust collector could be incorporated into the storage tank and deposit the collected dust into the tank. The vacuum system, in those implementations, would draw air from the tank and conveyor system.

The proppant holding container may have any one of a variety possible sizes (storage capacities), shapes, and styles. The proppant holding container can have any number of (one or more) hoppers-airlocks-discharges.

The ramps could be completely separate objects which are transported separately and put in place (e.g., as shown in FIGS. 5-8) for work.

In some implementations, the system disclosed herein has only one proppant unloading station, whereas in other implementations, the system disclosed herein has two (or possibly more than two) proppant unloading stations. In implementations that include only one proppant unloading station, a trailer may have to move in order to unload each trailer hopper. In implementations that have more than one proppant unloading station, the trailer may be able to unload more than one trailer hopper (one into each proppant unloading station) simultaneously. The system components can be connected, or connectable, together in any one of a variety of possible ways—to facilitate system redundancy and to facilitate ramping up (or down) system capacity. Moreover, in some implementations, one or more of the components may be physically separate from (and not mounted on the same chassis as) the other system components. For example, in some implementations, the drive over conveyor may be provided as a separate piece of equipment from the other system components. In those implementations, a mechanical conveyor would be provided to mechanically convey material from the drive over conveyor to the separate container. As another example, the blowers may be provided as a separate piece of equipment. In those implementations, the blowers would be connected to the air locks at the bottom of the storage container by pneumatic lines. In general, any system component(s) provided on a separate base (e.g., not mounted on the same chassis as the other system components) would be operationally connected into the system (and to the other system components) as shown in the drawings and otherwise described herein to the other system components. In some implementations, more than one of the system components may be provided as a physically discrete component (and not mounted on the same chassis as the other system components).

Moreover, while this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are disclosed herein as occurring in a particular order, this should not be understood as requiring that such operations be performed in the particular order shown or in sequential order, or that all represented operations be performed, to achieve desirable results.

The systems described herein are material handling system. These systems can be used, of course, to deliver proppant (e.g., sand, treated sand, or man-made ceramic materials) designed to keep induced hydraulic fractures open, during or following a fracturing treatment, or to deliver any one of various other types of solid materials (e.g., any bulk powder or granular material; sand, grain, cement, powdered chemicals, salt, etc.)

The system is described as being useful at a worksite (e.g., one that includes one or more hydraulic fracturing wellheads). The worksite need not have actual wellheads in place though. Instead, a worksite could be a location where fracking is intended to take place, but where not wellheads are in place yet. The worksite could also be at a temporary storage location. The worksite could also be at a material processing site. The system could work for any bulk powder or granular material; sand, grain, salt, etc.

The system described herein is portable. Portability, however, may be provided for in a variety of other ways than just those explicitly mentioned herein.

The material handling systems disclosed in FIGS. 19-24, for example, have two pods connected in a train (i.e., connected between a common surge bin and a common pneumatic conveying line). In some implementations, more than two pods can be connected in a train (i.e., connected between a common surge bin and a common pneumatic conveying line). In those instances, the valving may be controlled in manner (e.g., by an automatic system controller) in accordance with the overriding principles disclosed herein—to deliver a substantially constant flow of proppant through the pneumatic conveying line, efficiently. In this regard, the material handling system may be controlled so as to switch between pods—from one to another to another—to receive proppant from the surge bin above and to deliver proppant into pneumatic conveying line below. Moreover, the valving may be further controlled to help avoid plugging in the pneumatic conveying line.

The material handling systems disclosed in FIGS. 19-24, for example, have pairs of fill valves F1, F2 and pairs of discharge valves D1 D2 for each pod. In some implementations, however, a material handling system may have only one fill valve and one discharge valve per pod.

The material handling systems disclosed in FIGS. 19-24, for example, show one train (i.e., multiple pods connected to a common surge bin and a common pneumatic conveying line). In some implementations, however, a material handling system might include multiple trains (i.e., multiple sets of pods, each set having multiple pods connected to a common surge bin and a common pneumatic conveying line). In some such implementations, pods in the different trains may be connected to a common surge bin but different pneumatic conveying lines. Alternatively, in some such implementations, pods in the different trains may be connected to different surge bins but the same pneumatic conveying line.

The material handling systems disclosed in FIGS. 19-24, for example, show multiple valves for controlling the flow of granular material (e.g., proppant) and/or air, dust, etc. through the system and sensors for sensing pressure, level, etc. In some implementations, these valves are controlled by a control system (e.g., that is part of the system), based on input signals from the level sensors and/or the level sensors and/or other input parameters, such as timer signals. The valves, in a typical implementation, are configured to be automatically controlled (e.g., by the control system) in response to some, or potentially all, of the input signals, depending on the particular implementation.

The material handling systems disclosed in FIGS. 19-24, for example, show a full level sensor and an empty level sensor. In a typical implementation, these can be implemented as level sensors, as described herein. In some implementations, they may be different kinds of sensors (e.g., weight sensors) that provide an indication of proppant weight inside its pod, which may provide an indirect, yet still usable, indication of proppant level (which would be related to weight) in the pod.

FIG. 25 shows one example of a timing diagram for a material handling system (e.g., the material handling system in FIG. 19). Numerous variations of this timing diagram are possible. And the absolute values of times (e.g., specific seconds for various process functionalities) obviously can vary considerably.

Other implementations are within the scope of the claims.

What is claimed is:

1. A material handling system comprising:
a chassis;
a conveyor system supported by the chassis;
a storage container supported by the chassis, wherein the conveyor system is configured to convey a granular material from a material unloading station to an inlet of the storage container,
a plurality of pods beneath the storage container, wherein each pod is connected to the storage container by a corresponding one of a plurality of pod fill valves;
a pneumatic conveying line beneath the pods, wherein the pneumatic conveying line is connected to each of the pods;
a plurality of air supply lines, wherein each air supply line is configured to deliver pressurized air into a corresponding one of the pods; and
a reservoir connected between the pneumatic conveying line and the air supply lines;
wherein each pod has a full level sensor configured to sense when the pod is full or close to full, and an empty level sensor configured to sense when the pod is empty or close to empty.

2. The material handling system of claim 1, further comprising:
an automatic system controller, wherein the automatic system controller is configured to control movement of granular material and air into and out of the pods during system operation at least in part in response to signals from the full level sensor and the empty level sensor.

3. The material handling system of claim 2, wherein the automatic system controller is configured to control the movement of granular material into and out of the pods such that the timing of granular material flowing into and out of each respective one of the pods is staggered.

4. The material handling system of claim 1, further comprising:
an adjustable flow control element for controlling a flow of air in each respective one of the air supply lines.

5. The material handling system of claim 1, further comprising an orifice or flow control element between the reservoir and the pneumatic conveying line.

6. The material handling system of claim 2, further comprising:
a plurality of air supply lines, wherein each of the air supply lines is configured to supply pressurized air into an upper portion of a corresponding one of the pods; and
a plurality of air supply control valves, wherein each air supply control valve is configured to control flow of the pressurized air through a corresponding one of the plurality of air supply lines.

7. The material handling system of claim 6, further comprising:
an air-line that is connected in parallel with each air supply valve, wherein the air-line has a valve and a metering device or orifice.

8. The material handling system of claim 7, further comprising:
a plurality of air vent lines, wherein each of the air vent lines is configured to facilitate venting of a corresponding one of the plurality of pods; and
a plurality of vent valves, wherein each of the vent valves is configured to control flow through a corresponding one of the air vent lines.

9. The material handling system of claim 8, wherein each of the air vent lines vents into the storage container.

10. The material handling system of claim 8, further comprising:
a plurality of fill lines, wherein each of the fill lines is configured to facilitate flow of the granular material from the storage container to a corresponding one of the pods; and
at least one fill valve for each respective one of the fill lines, wherein the at least one fill valve is configured to control flow through its corresponding fill line.

11. The material handling system of claim 10, wherein the at least one fill valve for each respective one of the fill lines comprises a pair of fill valves that are connected in series with one another to control flow of the granular material through the fill line.

12. The material handling system of claim 10, further comprising:
a plurality of discharge lines, wherein each of the discharge lines is configured to facilitate flow of the granular material from a corresponding one of the pods to the pneumatic conveying line; and at least one discharge valve for each respective one of the discharge lines, wherein the at least one discharge valve is configured to control flow through its corresponding discharge line.

13. The material handling system of claim 12, wherein the at least one discharge valve for each respective one of the discharge lines comprises a pair of discharge valves that are connected in series with one another to control flow of the granular material through the discharge line.

14. The material handling system of claim 13, wherein the automatic system controller is configured to control the air supply control valves, the vent valves, the fill valves, and the discharge valves.

15. The material handling system of claim 14, wherein the automatic system controller is configured to control the air supply control valves, the vent valves, the fill valves, and the discharge valves, at least in part, responsive to signals from the full level sensor and the empty level sensor.

16. The material handling system of claim 15, further comprising:
a timer circuit, wherein the automatic control system utilizes the timer circuit to:
track a maximum filling time for a pod filling process and causes flow of granular material into the pod to cease upon expiration of the maximum filling time in an absence of a signal from the full level sensor, and/or
track a maximum emptying time for a pod emptying process and causes flow of granular material out of the pod to cease upon expiration of the maximum emptying time in the absence of a signal from the empty level sensor.

17. The material handling system of claim 1, further comprising:
a constricted section of the pneumatic conveying line downstream of one or more branch offs for the air supply lines from the pneumatic conveying line and upstream of tie-ins for pod discharge lines to the pneumatic conveying line.

18. The material handling system of claim 1, further comprising:
a first air source supported by the chassis and connected to the pneumatic conveying line; and
a second air source supported by the chassis, wherein the second air source is connected to a plurality of air supply lines,
wherein each of the air supply lines is configured to supply pressurized air into an upper portion of a corresponding one of the pods.

19. The material handling system of claim 18, further comprising:
a reservoir connected to an output of the second air source and to each of the air supply lines.

20. The material handling system of claim 18, wherein an input of the second air source is connected to an output of the first air source.

21. The material handling system of claim 18, further comprising:
a pressure control element coupled to an output of the second air source.

22. A material handling system comprising:
a chassis;
a conveyor system supported by the chassis;
a storage container supported by the chassis, wherein the conveyor system is configured to convey a granular material from a material unloading station to an inlet of the storage container,
a plurality of pods beneath the storage container, wherein each pod is connected to the storage container by a corresponding one of a plurality of pod fill valves;
a pneumatic conveying line beneath the pods, wherein the pneumatic conveying line is connected to each of the pods;
wherein each pod has a full level sensor configured to sense when the pod is full or close to full, and an empty level sensor configured to sense when the pod is empty or close to empty;
an automatic system controller, wherein the automatic system controller is configured to control movement of granular material and air into and out of the pods during system operation at least in part in response to signals from the full level sensor and the empty level sensor;
a plurality of air supply lines, wherein each of the air supply lines is configured to supply pressurized air into an upper portion of a corresponding one of the pods;
a plurality of air supply control valves, wherein each air supply control valve is configured to control flow of the pressurized air through a corresponding one of the plurality of air supply lines; and
an air-line that is connected in parallel with each air supply valve, wherein the air-line has a valve and a metering device or orifice.

23. The material handling system of claim 22, further comprising:
a plurality of air vent lines, wherein each of the air vent lines is configured to facilitate venting of a corresponding one of the plurality of pods; and
a plurality of vent valves, wherein each of the vent valves is configured to control flow through a corresponding one of the air vent lines.

24. The material handling system of claim 23, wherein each of the air vent lines vents into the storage container.

25. The material handling system of claim 23, further comprising:
a plurality of fill lines, wherein each of the fill lines is configured to facilitate flow of the granular material from the storage container to a corresponding one of the pods; and
at least one fill valve for each respective one of the fill lines, wherein the at least one fill valve is configured to control flow through its corresponding fill line.

26. The material handling system of claim 25, wherein the at least one fill valve for each respective one of the fill lines comprises a pair of fill valves that are connected in series with one another to control flow of the granular material through the fill line.

27. The material handling system of claim 25, further comprising:
a plurality of discharge lines, wherein each of the discharge lines is configured to facilitate flow of the granular material from a corresponding one of the pods to the pneumatic conveying line; and
at least one discharge valve for each respective one of the discharge lines, wherein the at least one discharge valve is configured to control flow through its corresponding discharge line.

28. The material handling system of claim 27, wherein the at least one discharge valve for each respective one of the discharge lines comprises a pair of discharge valves that are connected in series with one another to control flow of the granular material through the discharge line.

29. The material handling system of claim 28, wherein the automatic system controller is configured to control the air supply control valves, the vent valves, the fill valves, and the discharge valves.

30. The material handling system of claim 29, wherein the automatic system controller is configured to control the air supply control valves, the vent valves, the fill valves, and the discharge valves, at least in part, responsive to signals from the full level sensor and the empty level sensor.

31. The material handling system of claim 30, further comprising:
a timer circuit, wherein the automatic control system utilizes the timer circuit to:
track a maximum filling time for a pod filling process and causes flow of granular material into the pod to cease upon expiration of the maximum filling time in an absence of a signal from the full level sensor, and/or
track a maximum emptying time for a pod emptying process and causes flow of granular material out of the pod to cease upon expiration of the maximum emptying time in the absence of a signal from the empty level sensor.

32. A material handling system comprising:
a chassis;
a conveyor system supported by the chassis;
a storage container supported by the chassis, wherein the conveyor system is configured to convey a granular material from a material unloading station to an inlet of the storage container,
a plurality of pods beneath the storage container, wherein each pod is connected to the storage container by a corresponding one of a plurality of pod fill valves;
a pneumatic conveying line beneath the pods, wherein the pneumatic conveying line is connected to each of the pods;
wherein each pod has a full level sensor configured to sense when the pod is full or close to full, and an empty level sensor configured to sense when the pod is empty or close to empty; and
a constricted section of the pneumatic conveying line downstream of one or more branch offs for the air supply lines from the pneumatic conveying line and upstream of tie-ins for pod discharge lines to the pneumatic conveying line.

33. A material handling system comprising:
a chassis;
a conveyor system supported by the chassis;
a storage container supported by the chassis, wherein the conveyor system is configured to convey a granular material from a material unloading station to an inlet of the storage container,
a plurality of pods beneath the storage container, wherein each pod is connected to the storage container by a corresponding one of a plurality of pod fill valves;
a pneumatic conveying line beneath the pods, wherein the pneumatic conveying line is connected to each of the pods,
wherein each pod has a full level sensor configured to sense when the pod is full or close to full, and an empty level sensor configured to sense when the pod is empty or close to empty;

a first air source supported by the chassis and connected to the pneumatic conveying line;
a second air source supported by the chassis, wherein the second air source is connected to a plurality of air supply lines,
wherein each of the air supply lines is configured to supply pressurized air into an upper portion of a corresponding one of the pods; and
a reservoir connected to an output of the second air source and to each of the air supply lines.

34. A material handling system comprising:
a chassis;
a conveyor system supported by the chassis;
a storage container supported by the chassis, wherein the conveyor system is configured to convey a granular material from a material unloading station to an inlet of the storage container,
a plurality of pods beneath the storage container, wherein each pod is connected to the storage container by a corresponding one of a plurality of pod fill valves;
a pneumatic conveying line beneath the pods, wherein the pneumatic conveying line is connected to each of the pods;
wherein each pod has a full level sensor configured to sense when the pod is full or close to full, and an empty level sensor configured to sense when the pod is empty or close to empty;
a first air source supported by the chassis and connected to the pneumatic conveying line; and
a second air source supported by the chassis, wherein the second air source is connected to a plurality of air supply lines,
wherein each of the air supply lines is configured to supply pressurized air into an upper portion of a corresponding one of the pods, and
wherein an input of the second air source is connected to an output of the first air source.

35. A material handling system comprising:
a chassis;
a conveyor system supported by the chassis;
a storage container supported by the chassis, wherein the conveyor system is configured to convey a granular material from a material unloading station to an inlet of the storage container,
a plurality of pods beneath the storage container, wherein each pod is connected to the storage container by a corresponding one of a plurality of pod fill valves;
a pneumatic conveying line beneath the pods, wherein the pneumatic conveying line is connected to each of the pods,
wherein each pod has a full level sensor configured to sense when the pod is full or close to full, and an empty level sensor configured to sense when the pod is empty or close to empty;
a first air source supported by the chassis and connected to the pneumatic conveying line; and
a second air source supported by the chassis, wherein the second air source is connected to a plurality of air supply lines,
wherein each of the air supply lines is configured to supply pressurized air into an upper portion of a corresponding one of the pods; and
a pressure control element coupled to an output of the second air source.

* * * * *